United States Patent [19]

Richeson, Jr. et al.

[11] 3,845,242

[45] Oct. 29, 1974

[54] VIDEO SIGNAL PROCESSING SYSTEM FOR FACSIMILE TRANSMISSION

[75] Inventors: William E. Richeson, Jr.; Robert H. Dreisbach, both of Fort Wayne, Ind.

[73] Assignee: Minnesota Mining and Manufacturing Company, St. Paul, Minn.

[22] Filed: Nov. 21, 1972

[21] Appl. No.: 308,552

[52] U.S. Cl. ................ 178/6, 178/DIG. 3, 179/2 E, 179/2 R

[51] Int. Cl. ................ H04n 1/32

[58] Field of Search ............... 178/6, DIG. 3; 332/9; 179/2; 325/44, 25

[56] References Cited

UNITED STATES PATENTS

| | | | |
|---|---|---|---|
| 3,471,638 | 10/1969 | Groat | 178/6 |
| 3,495,032 | 2/1970 | Smith | 178/6 |
| 3,515,803 | 6/1970 | Lorang | 178/6 |
| 3,524,023 | 8/1970 | Whang | 179/2 |
| 3,619,493 | 11/1971 | Krallinger | 178/6 |
| 3,624,282 | 11/1971 | Salaman | 178/6 |
| 3,641,468 | 2/1972 | Hodder | 332/9 |

*Primary Examiner*—Howard W. Britton
*Assistant Examiner*—Edward L. Coles
*Attorney, Agent, or Firm*—Alexander, Sell, Steldt & Delahunt

[57] ABSTRACT

A facsimile transceiver for use with telephone line networks in which the original image is photoelectrically scanned to produce a video baseband signal, the baseband signal is shaped by a non-linear transfer network and converted into a relatively high frequency period-modulated signal, whose carrier frequency is outside the passband of the telephone transmission link and, after frequency division to a frequency within the passband, the low frequency components of the resultant carrier signal are emphasized. In addition, the signal is pre-equalized to partially compensate for the delay and amplitude characteristics of the voice-grade telephone line transmission facilities which carry the period-modulated signal to a receiving station transceiver. The non-linear circuit which shapes the video baseband signal adapts to the changing character of the video signal being sent, providing improved gray-scale reproduction of the facsimile copy while enhancing the resolution of detailed image segments through variable emphasis of the high frequency components of the baseband signal. In the receiver section of the transceiver, the incoming signal is de-emphasized and post-equalized for correction of delay characteristics of the telephone line transmission link after which the upper sideband is removed, and the resulting signal, which possesses a substantial A.M. content is passed through a first hard-limiter which in effect produces a double sideband carrier signal which is then post-equalized for correction of the amplitude characteristics of the telephone line transmission link whereupon the signal is again hard-limited before being passed to a period-to-amplitude demodulator whose output, after further amplification, shaping and emphasis, drives a stylus to produce a faithful replica or facsimile of the original image.

10 Claims, 24 Drawing Figures

VIDEO SIGNAL PROCESSING SYSTEM FOR FACSIMILE TRANSMISSION

BACKGROUND OF THE INVENTION

The present invention relates generally to video transmission systems and more particularly, although in its broader aspects not exclusively, to facsimile systems in which images are transmitted over conventional voice-grade telephone facilities.

In recent years, facsimile transceivers acoustically coupled to telephone lines have come into widespread use, particularly in business, because of their ability to send documented data (in the form of charts, photographs, diagrams or text) to distant offices, without the delays accompanying the delivery of a physical copy by messenger or through the mails.

Such transceivers normally comprise an arrangement for photoelectrically scanning the document image to produce a video baseband signal and means for converting that baseband signal into a frequency modulated signal suitable for transmission over conventional telephone facilities. In such systems, white is commonly represented by a signal transmitted at 1500 Hz., black by a signal at 2450 Hz., and the white-to-black "gray-scale" by signals at the intermediate frequencies.

Typical transceivers of this class have been capable of transmitting, in six minutes, the image presented by 8 ½ inch by 11 inch (letter-size) document with a resolution of 96 lines per inch, measured both vertically and horizontally.

The limited bandwidth of the available telephone facilities (and the fact that the character of any given telephone transmission link, from the standpoint of frequency response, phase delay, noise, attenuation, etc., can be predicted only statistically) makes further improvement in resolution, or in the speed of transmission, difficult.

Assume, for example, that one desires to send a letter-size image comprising 96 alternately black and white vertical lines per horizontal inch. Each black-center to white-center transition yields a half-cycle of the baseband signal. Thus, with 96 horizontal and 96 vertical scanning lines per inch, 861,696 or ($8.5 \times 11 \times 96^2$) half-cycles must be sent in the course of scanning the entire document (assuming no lost time for margins in the copy). Wider lines on the document would, of course, generate lower frequency baseband signals, but for 96 lines of resolution, the bandwidth required for transmission may be approximated, for varying transmission times, as follows:

| Transmission Time | Bandwidth of Video Signal (in Hz.) |
|---|---|
| 1 second | 430,848 |
| 30 seconds | 14,362 |
| 1 minute | 7,181 |
| 2 minutes | 3,590 |
| 3 minutes | 2,393 |
| 4 minutes | 1,795 |
| 5 minutes | 1,436 |
| 6 minutes | 1,197 |

In a conventional FM facsimile system of the type noted above, in which the instantaneous frequency of the transmitted tone varies between 1500 Hz. and 2450 Hz., the "carrier" frequency may be considered to be at the midband frequency, 1,975 Hz. (in reality, for a variety of reasons to be discussed, the true carrier frequency may be well removed from the midband frequency; nonetheless, for the purposes of this initial discussion, nominally placing the carrier at the midband frequency provides a useful beginning point.) With the carrier at 1,975 Hz., it can be seen that, at the three-minute transmission rate, lower sideband components of the conventional FM facsimile signal would appear at "negative frequencies" (i.e., beyond zero Hz.). In practice, such negative frequency sideband components would be detected as "spectral foldback interference" appearing at lower, positive frequencies. Although the slower 4 minute transmission rate does not result in foldback, it yields a lower sideband frequency extreme of 180 Hz. which is below the lower limit of the passband of most telephone facilities. Even the five minute transmission time, which yields lower sideband components, in the example given, at 536 Hz., presents difficulties due to the fact that the phase and amplitude characteristics of voice-grade telephone facilities become increasingly uncertain below 700 Hz., and hence difficult to correct with fixed equalization.

In addition, of course, interference will be introduced, not only during transmission, but as the video signal is processed within the facsimile system, further reducing of the speed and quality of facsimile transmission.

It accordingly is the present object of the invention to reduce both the time required to transmit an image over a conventional telephone facility using facsimile techniques, while at the same time improving the quality of that transmitted image.

In a principal aspect, the present invention takes the form of a facsimile communication system in which both the video baseband signal and the frequency modulated signal are shaped by a combination of signal transfer circuits in order to improve the speed and quality of image transmission.

In the transmitter section of the facsimile transceiver, the signal produced through the photoelectric scanning of the original image is amplified, by a variable gain circuit which provides automatic background control, to producing a signal whose amplitude is directly related to the intensity of the light reflected from the document being scanned. This signal is inverted, added to a constant reference voltage, and applied to an adaptive, non-linear transfer network. This network improves the quality of gray-scale transmission by preferentially amplifying signals in the near-black gray-scale range. Still further preferential amplification of signals in the near-black region is accomplished at the receiving station following detection. "Edge enhancement" is accomplished in this network through the preferential amplification of high amplitude, high frequency signal variations. The non-linear network is effective to shift substantially the dc content of the baseband signal toward the black end of the scale, resulting in an upward shift in the effective carrier frequency (mean spectrum) of the signal applied to the telephone facility. At the receiver, following detection, the dc level of the detected signal is restored to its proper value. The adaptive network at the transmitter is also effective to block small signal changes at both the white and black ends of the gray-scale, thereby providing a uniform background free of "gray hash". Small amplitude variations are again blocked at the receiver to eliminate gray hash which might otherwise be introduced by noise on the communication link.

After the video baseband signal has been shaped by the adaptive, non-linear transfer network, components of the reshaped baseband signal having frequencies higher than a predetermined value are reduced in magnitude to minimize spectral foldback interference. The baseband signal thus shaped is then employed to time a controlled source of substantially square-wave signals, the time duration separating the zero-crossings of which is directly related to the magnitude of the baseband signal. At the receiver, a complementary period-to-amplitude demodulator is employed to reconstruct the original baseband signal. The period generator employed in the transmitter samples the baseband signal, converting baseband signal amplitudes into time periods, this "sampling" being first accomplished at a high frequency and the frequency of the resulting signal is thereafter reduced, by binary frequency division, to produce a transmittable signal having positive and negative excursions whose periods are a function of the sampled amplitudes of the original baseband signal.

The low frequency components of the transmitted signal are emphasized at the transmitter and de-emphasized at the receiver, so as to maximize the signal-to-noise ratio of the extreme sideband components. In addition, there is a pre- and post-equalization of the carrier signal so as to equalize the telephone line's amplitude characteristic, the tendency toward "sideband capture" being reduced by hard-limiting the received signal before its low frequency components are post-equalized at the receiving end.

Moreover, the ability of the system to operate effectively with transmission lines whose frequency vs. delay characteristics are imperfectly equalized is enhanced by removing the upper sideband of the received signal prior to limiting, the limiting being effective to restore a virtual upper sideband in correct phase relation to the received lower sideband.

Because of the received signal displays substantial amplitude-modulation, the response of the receiver is further improved by the employment of automatic gain control prior to equalization and detection.

These and other objects, features and advantages of the present invention will be made more apparent in the following detailed description of a specific embodiment of the invention.

BRIEF DESCRIPTION OF THE DRAWINGS

FIG. 1 is a block diagram of the transmitter section of the transceiver, the characteristics of which are further illustrated by FIGS. 1A through 1D, in which:

FIG. 2 is a block diagram of the receiver section of the transceiver, the characteristics of which are further illustrated by FIGS. 2A through 2C, in which:

DESCRIPTION OF THE PREFERRED EMBODIMENT

In the description to follow, the overall facsimile transmission system will be generally described in connection with FIGS. 1 and 2 of the drawings in order to provide a background for the more detailed description to be given in connection with FIGS. 6 and 7 of the drawings.

Figure 1:
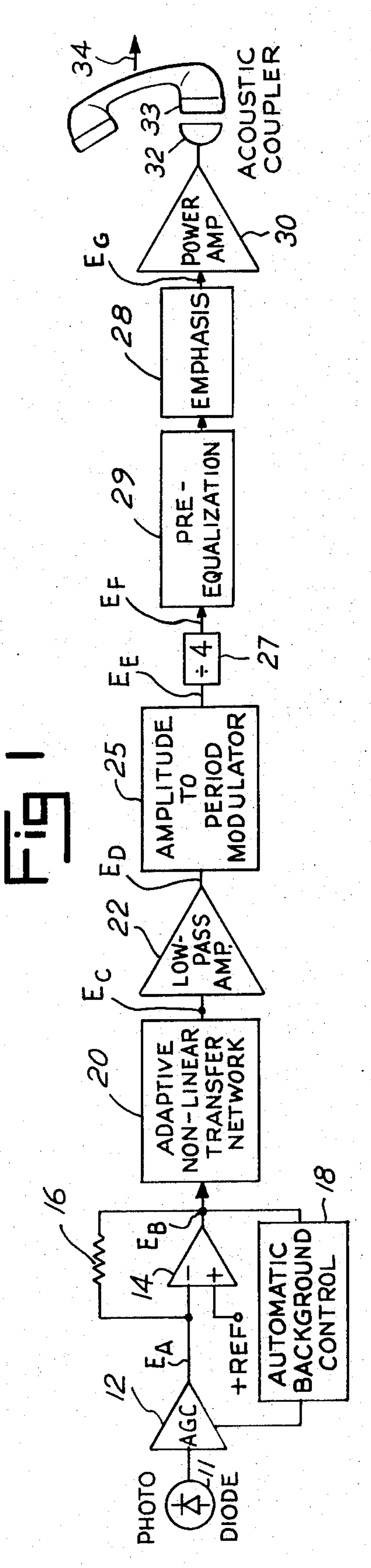

As shown in FIG. 1, a photodiode 11 is employed to create an electrical signal having an amplitude proportionally related to the intensity of light reflected from a document being scanned.

Figures 1A, 1B, 1C, 1D:
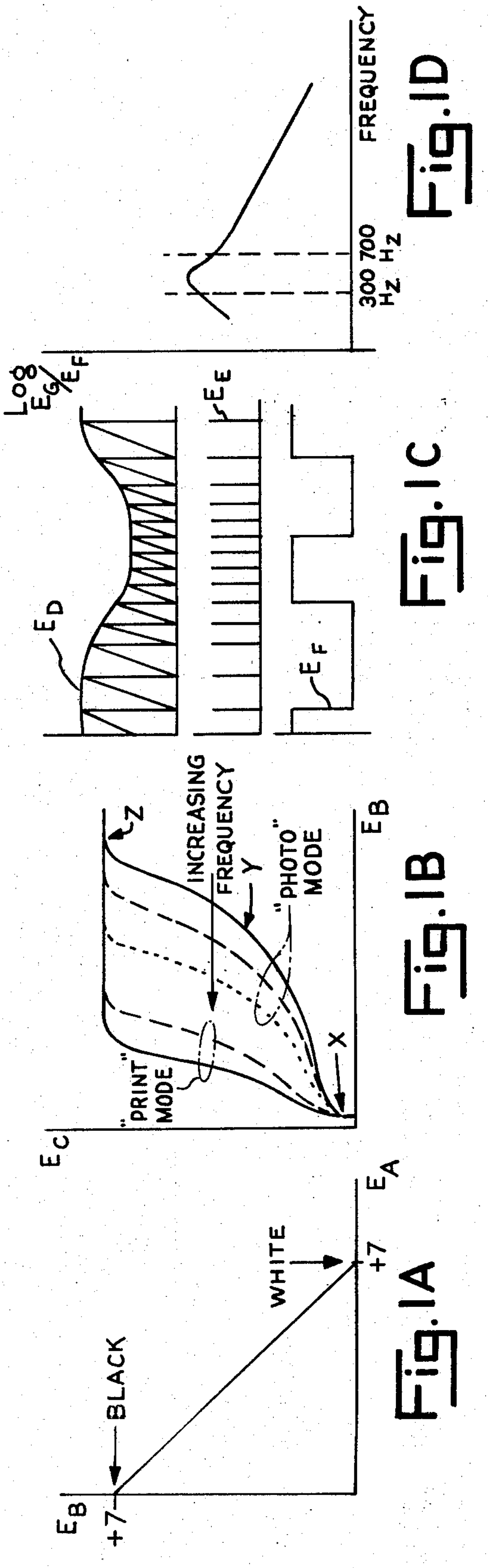
FIG. 1A illustrates the transfer characteristics of operational amplifier 14 and its associated circuitry.
FIG. 1B illustrates the transfer characteristics of the adaptive, non-linear transfer network 20.
FIG. 1C shows three illustrative waveforms which depict the operation of the amplitude-to-period modulator 25 and the frequency divider 27.
FIG. 1D illustrates the gain vs. frequency characteristics of low-band pre-emphasis circuit 28.

The output from the photodiode 11 is applied to the input of a gain controlled amplifier 12 whose output is supplied to the negative or "inverting" input of an operational amplifier 14. Positive-going signals applied to this inverting input produce negative-going output signals (which partially are fed back, through resistance 16, to the inverting input). A reference potential is applied to the positive input of operational amplifier 14. The net result, as shown by FIG. 1A of the drawings is that the signal ($E_B$) appearing at the output of the amplifier 14 is the sum of a constant voltage plus the inverted output signal ($E_A$) from gain control amplifier 12.

An automatic background control circuit 18 is connected to sense the signal $E_B$ appearing at the output of operational amplifier 14 and, in response thereto, to control the gain of amplifier 12 so that for non-white image background (for example dark printing on pastel paper), the background is treated as white, instead of gray, by the system.

As will be more apparent in connection with the detailed description to follow, the output waveform from operational amplifier 14 establishes the nominal white background at zero signal level, while full black is established at 7 volts. A photodiode 11 senses reflected light from nonblack sections of the image, the signal level at the output of operational amplifier 14 is reduced proportionately.

The adaptive non-linear transfer network 20 is employed to reshape the waveform of the video baseband signal prior to the conversion of that signal into a period modulated signal suitable for transmission over a telephone link. The characteristics of network 20 are shown generally by the graph of its transfer characteristics, FIG. 1B, when operating in both its PRINT and PHOTO modes. The solid line, photo mode curve of FIG. 1B indicates the response of the transfer network 20 to low frequency baseband signals, while the dashed and dotted line "photo mode" curves respectively represent the response of the network 20 to intermediate and high frequency baseband signals respectively.

Note, first, that the network 20 provides a low level thresholding effect, so that small variations in the input signal $E_B$ near both the white and black ends of the scale do not appear as variations in the output signals $E_C$.

Next, it may be observed that for low frequency signals, small variations in the input signal $E_B$ near the black end of the scale create larger variations in the output signal $E_C$ than do comparable variations at the white end of the scale. The expansion of the dark gray scale and corresponding compression of the light gray portion of the scale is accomplished by the transfer characteristic of the network 20 which, in the amplitude region indicated by Y in FIG. 1B, improves the overall signal-to-noise ratio for the system, accomplished by the fact that greater signal variations in the critical near black region are transmitted, decreasing the effect of noise on signals in that critical region.

Region Z of the curves of FIG. 1 illustrate the manner in which the maximum level of the output signal $E_C$ is prohibited from increasing beyond the predetermined value. By the same token, input signals having an amplitude less than the value indicated by the region X in FIG. 1B are rigidly fixed to the zero or full white output signal level. The provision of stable black and white levels is important, as will be seen, in preventing unwanted frequency components in the spectrum of the signal to be transmitted over the telephone facility.

The transfer network 20 responds differently to baseband signals of different frequencies. As the frequency of the baseband signal increases, the transfer gain of the network 20 increases, particularly for higher amplitude baseband signals. For reasons to be discussed in more detail, the ability of the network 20 to change its transfer characteristics with changing baseband signal frequency has the effect of improving the resolution and contrast for detailed images while also permitting an improvement in the gray-scale response for lower frequency baseband components.

It should also be noted that the non-linear transfer network 20 has the effect of shifting the average value, or D.C. content, of high frequency baseband signals toward the black end of the scale. Since it is the D.C. content of the baseband signal which dictates the effective carrier frequency of the period-modulated signal to be transmitted over the telephone facility, the network 20 effectively moves the carrier frequency upwards when high frequency baseband signals appear, providing more room for the lower sideband and improving the overall high frequency response of the system. The improvement in the ability to send high frequency baseband signals means that the speed of image transmission can be increased or, for the same transmission speeds, the resolution of the system may be improved.

The transfer network 20 also has important characteristics not shown by the transfer curves Y of FIG. 1B. First, the network is designed to have rapid recovery time; that is, the circuit is designed to respond readily to rapid white-to-black transitions through the provision of low impedance paths through which circuit capacitances may rapidly discharge (i.e., rapidly recover).

At the same time, circuit response times are selected so that the network 20 effectively acts as a low-pass filter, prohibiting high frequency baseband components from being transferred to the modulator causing spectral foldback interference upon detection. The amplitude of any such high frequency components which do appear at the output of network 20 are further reduced by the low-pass amplifier 22 which is interposed between the network 20 and the input of an amplitude-to-period modulator 25.

The modulator 25 generates a sequence of impulses ($E_E$) as shown by the upper waveshape of FIG. 1C, the time duration between pulses being a function of the amplitude of the applied reshaped baseband signal $E_D$. For baseband signals indicating white, a signal giving 6,000 time-markings per second is produced by the modulator 25. For black, the modulator 25 produces 9,800 time marks per second. A binary frequency divider 27 (composed of a pair of cascaded flip-flops) is used to produce a squarewave output signal of reduced frequency in which white is represented by a signal whose fundamental frequency is 1500 Hz. and black by a signal whose fundamental is at 2450 Hz.

The PEM signal $E_F$ is then shaped by the combination of low-band emphasis circuit 28 and pre-equalization circuit 29.

Pre-equalization circuit 29 provides partial correction of the delay and amplitude characteristics of the telephone transmission link, the remaining correction being provided at the receiving station.

The frequency response of the emphasis circuit 28, as shown in FIG. 1D of the drawings, decreases the amplitude of the high frequency components of the signal to be transmitted at the rate of approximately 6 db per octave. A hump in the gain vs. frequency curve is provided to boost signals in the range from approximately 300 to 700 Hz. while signals of approximately 100 Hz. and below are effectively blocked. As will be explained, signals in the range from approximately 300 to 700 Hz. are again emphasized at the receiving end.

The shaped signal from emphasis network 28 is then employed to drive a power amplifier 30 whose output is coupled, via an acoustic coupler 32 and the telephone handset 33, to a telephone transmission line 34 or alternately the output of the power amplifier is used to drive a data access arrangement.

Figure 2:
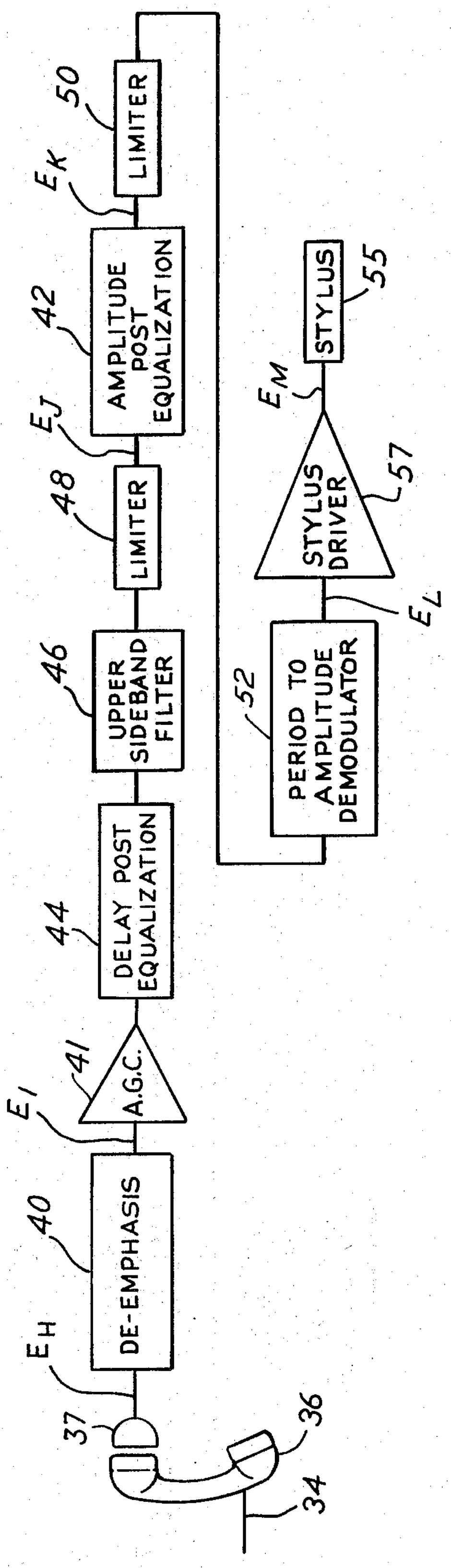

FIG. 2 of the drawings, a block diagram of the receiver section of the transceiver, illustrates the manner in which the received signal is equalized, detected and shaped to create, at the receiving station, a replica of the baseband signal originally created at the transmitter by the scanning of the original document. The reproduced baseband signal is then employed to drive an image producing stylus.

Figures 2A, 2B, 2C:
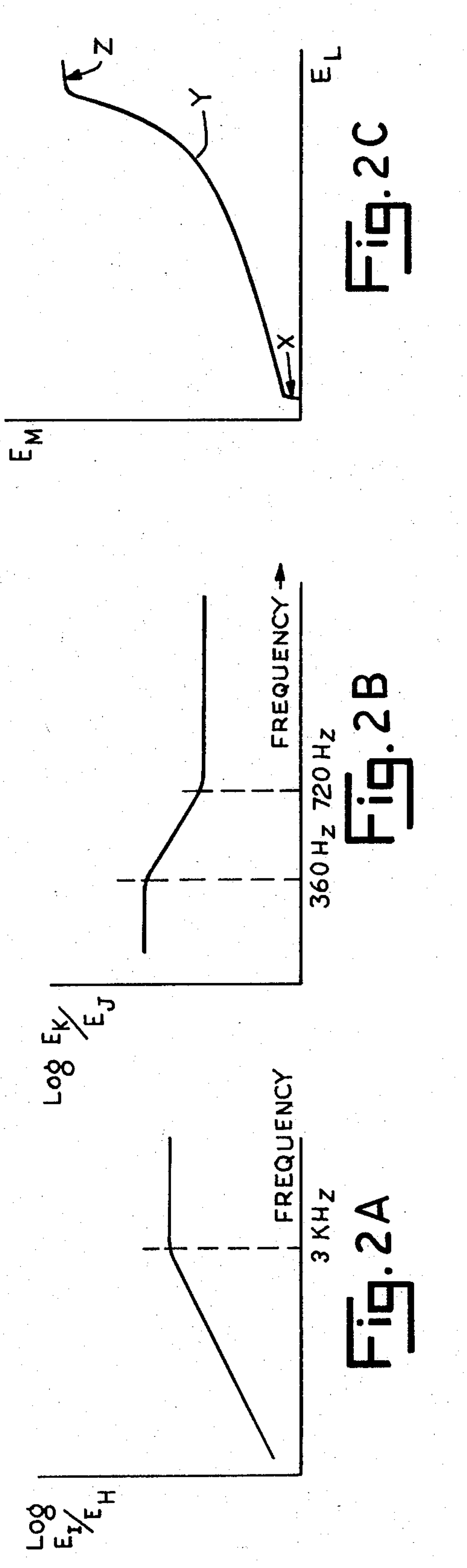
FIG. 2A shows the gain vs. frequency characteristics of the high-band restoration circuit 40.
FIG. 2B shows the gain vs. frequency characteristics of the low-band post-emphasis circuit 42.
FIG. 2C illustrates the transfer characgeristic of the stylus driving circuit 57.

The signal received over telephone line 34 is acoustically coupled through handset 36 and a receiving microphone transducer 37 to the input of de-emphasis circuit 40 whose frequency response is generally illustrated by the graph of FIG. 2A (alternately the data is received via a data access arrangement). It will be recalled that the low-frequency components of the transmitted signal were emphasized by emphasis circuit 28 at a rate generally equal to 6 db per octave. The complementary high-pass restoring network 40 correspondingly decreases the lower frequency signals at a rate of approximately 6 db per octave. Note, however, that there is no increase attenuation by network 40 in the range from approximately 300 to 720 Hz. which corresponds to increase in gain in the range contributed by pre-equalization circuit 29. (Indeed, rather than attenuating signals in this range, they are again amplitude equalized, as will be seen, by a post-equalization arrangement which includes filter 42, to be discussed.) The effect is to more efficiently make use of the allowed power that can be impressed on the phone line and devise the signal to noise ratio required to print the high frequency components with the desired fidelity. The two regions of 300 to 720 cps at the transmitter and the receiver are used for purposes of pre- and ost-equalization of the telephone transmission system whereas the minus and plus 6 db/oct. emphasis and de-emphasis is used for an entirely different purpose. The net effect of the latter is not for the purpose of correcting the system's amplitude response but, instead, to control the signal-to-noise ratio of parts of the transmitted spectrum.

Signals from the network 40 are then passed through an automatic gain controlled amplifier 41. It might be assumed that, because the signal transmitted over the telephone facility is period modulated (PEM) and not amplitude modulated, the use of automatic gain control is unnecessary. In fact, however, the received signal does possess substantial amplitude modulation, by virtue of the fact that the limited passband of the telephone facility effectively removes much of the upper sideband of the original signal. For this reason, the response of the receiver can be improved by first standardizing the amplitude of the received signal, thereby taking into account variations in the level of the received signal due to variations, from facility to facility, in telephone transmission.

The equalizer 44 is intended to correct for the dispersive delay characteristics of typical telephone facilities. The signal from equalizer 44 is passed through low-pass filter 46 which removes any higher frequency upper sideband components still present in the received signal in order to eliminate possible interference between the upper and lower sidebands caused by the different delay times at different frequencies exhibited by the telephone link.

The waveform of the signal appearing at the output of filter 46 contains substantial amplitude modulation which is removed by the first limiter 48, thus producing a squarewave signal in which the information is expressed entirely by the timings of the zero-crossings.

The hard-limited signal from limiter 48 is passed through a low-band post-equalization circuit 42 having a frequency response characteristic of the type shown in the graph of FIG. 2B.

Post-equalization circuit 42 accentuates the low-frequency components of the received carrier signal, and thus effectively corrects the positioning of the zero-crossings caused by a loss of frequency components during transmission. It is important here to note that the signal was limited by limiter 48 before its low frequency components are equalized. This is done to reduce the probability of sideband capture; that is, the possibility of eliminating certain zero-crossings altogether, by over-equalizing the low frequency components when the telephone transmission link in use has unexpectedly good low frequency response. The output signal $E_K$ from post equalizer circuit 42 is no longer rectangular, and, to restore its rectangular shape, it is again hard limited by the second limiter 50 before being applied to the input of a period-to-amplitude demodulator 82.

Demodulator 52 should be matched to the modulator 25; that is, a frequency demodulator or discriminator should be used with an FM modulator and a period demodulator is used with a PEM modulator. If in practice a FM modulator and a period demodulator are used together, such an arrangement would lead to the introduction of substantial distortion in a system of the type under consideration here. This results from the fact that the frequency and period are hyperbolically, not linearly, related. Where, as here, the frequency deviation (in this case 1500 Hz, to 2450 Hz. a span of 950 Hz. approaches the same order of magnitude of the carrier frequency, severe waveshape distortion, if not otherwise corrected, can occur. In the present arrangement, however, the amplitude of the original baseband signal at the transmitter was converted into variations in the period of the transmitted signal, and not variations in frequency. For this reason, a period-to-amplitude demodulator may be used without introducing distortion.

The waveform appearing at the output of demodulator 52 constitutes a distorted replica of the waveform at the input of the modulator 25 at the transmitter. It will be recalled that at the transmitter, the baseband waveform was intentionally distored for, among other purposes, partial gray-scale correction and the shifting of the DC content of the baseband signal toward the black end of the gray scale. A stylus driving circuit is used which has a transfer characteristic shaped to provide further gray scale correction while shifting the DC content of the detected signal back toward the white end of the gray scale. This is accomplished by the stylus driving network 57 which has a non-linear amplitude response of the kind generally depicted in FIG. 2C of the drawings. The region s X and Z establish more uniform full white and full black regions (eliminating gray hash) while the region Y provides perferential amplification of near-black signal variations while shifting the average value of the baseband toward the white end of the scale.

Before discussing further the manner in which the present invention improves the speed and quality of facsimile transmission over voice-grade telephone facilities, it is useful to at least briefly consider, in connection with FIG. 3 of the drawings, those characteristics which typify the typical telephone link.

Figures 3A, 3B, 3C:
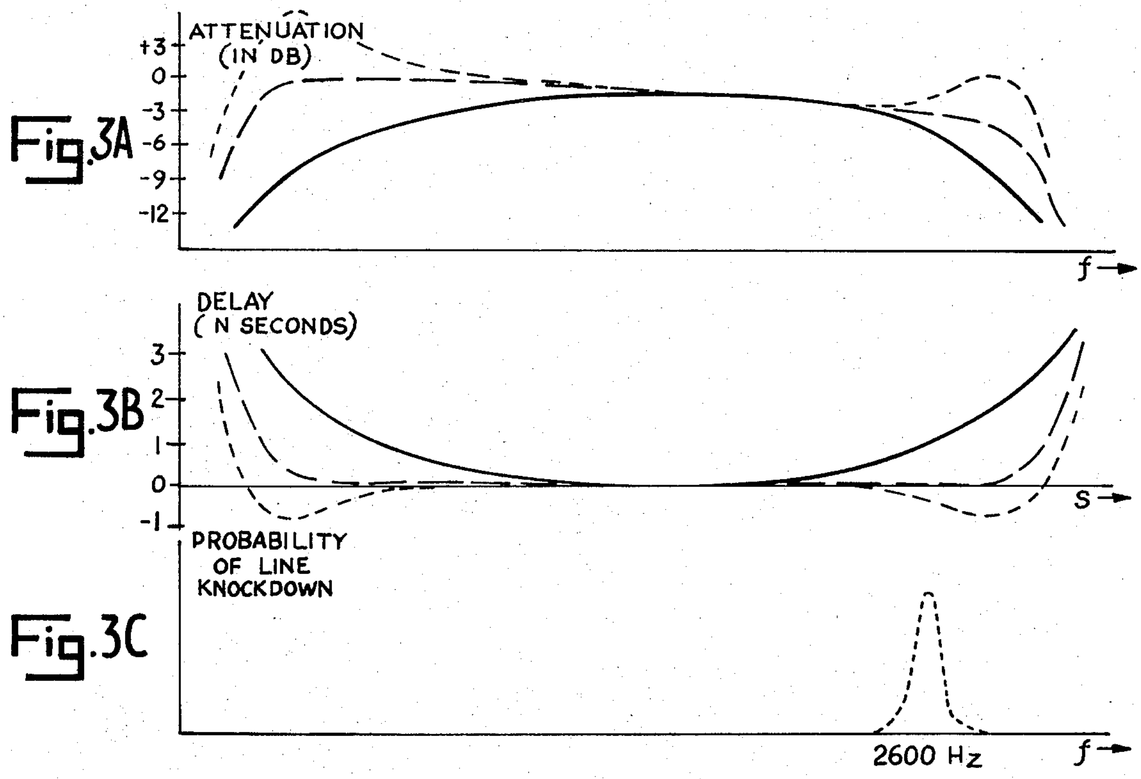
FIGS. 3A, 3B and 3C respectively illustrate typical attenuation, delay, and "line knockdown" characteristics of conventional, voice-grade telephone communication channels.

First, the attenuation vs. frequency characteristics of a typical telephone transmission facility are shown by the solid line curve of FIG. 3A of the drawings. It may be noted, first, that the signals lying outside the nominal passband (which extends from a lower limit of approximately 300 Hz. to an upper limit of approximately 3,000 Hz.,) are severely attenuated with respect to signals within the passband.

Some improvement can be obtained by amplitude equalization of the line. The dashed line curve of FIG. 3A shows the response of a telephone line which has been properly equalized, while the dotted curve illustrates the typical response of a facility which has been over-corrected.

Similarly, FIG. 3B of the drawings illustrates, with a solid-line curve, the delay vs. frequency characteristics of a typical facility, while the dashed and dotted lines respectively show optimum delay equalization and the over-corrected delay characteristics of such a facility.

Facsimile transceivers of the type under consideration here are normally used with a variety of telephone transmission lines. Typically, it is contemplated that a transceiver at one location will be used to communicate data to a variety of other locations over a variety of different telephone facilities. Moreover, even when only two terminal stations are employed the telephone call placed to the remote station may be routed differently at different times, leading to quite different characteristics of the facility. For this reason, optimum equalization, from the standpoint either of amplitude or delay, is seldom attained with fixed equalization. Accordingly, the facsimile transceiver employs equalizing circuits designed to correct the statistical average telephone facility, recognizing that unusually poor transmission links will be undercorrected, while unusually good facilities will be over-corrected.

A further characteristic of conventional voice-grade telephone facilities needs to be taken into account: such facilities commonly incorporate line knock-down devices responsive to sustained energy at a band centered at 2600 Hz. which is greater than the energy outside of this band. The knockdown command is derived from a 2600 Hz. tone applied to the long-distance line from the up stream calling telephone system. Typically, the next central office in the chain responds to such a tone by disconnecting the line from the calling office, restoring it to readiness for further use by another caller, and transmitting a further knockdown tone to the next office in the chain. This process continues, domino fashion, until the central office of the called party receives a knockdown tone and restores its lines to readiness for further traffic.

In facsimile transmission, tones of varying frequencies are transmitted to indicate various shades of gray. Sustained tones at or near 2600 Hz. cannot be permitted, however, because such tones would knockdown (disable) the transmission facility. Once again, the actual response of the telephone facility to tones near the established knockdown frequency can be predicted only statistically. FIG. 3C of the drawings shows the probability of line knockdown and illustates that tones in the range of approximately 2,500 to 2,700 Hz. that contain more energy inside this band as compared to the out of band energy whould be prohibited.

Because of these (and other) considerations, the frequency swing used for frequency-modulated facsimile transmission over voice-grade facilities, has normally been chosen to be from approximately 1,500 Hz. to 2,450 Hz. The selection of the upper limit (2,450 Hz.) places the maximum permissible frequency 150 Hz. below the designated line knockdown frequency, with a 50 Hz. safety spacing below 2,500 Hz., below which the probability of line knockdown repidly approaches zero.

Figure 4:
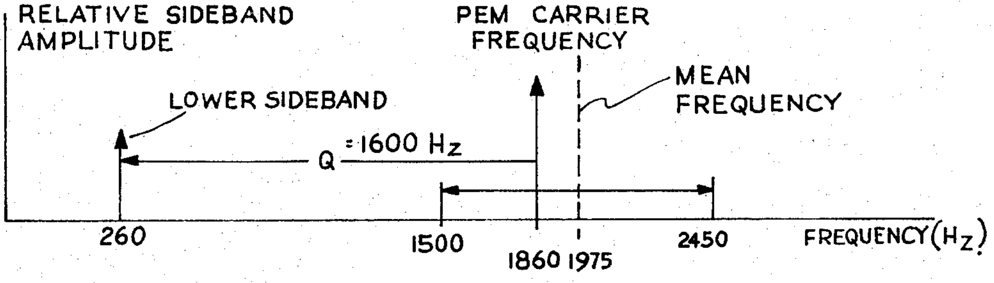
FIG. 4 illustrates a simplified frequency spectrum of a frequency modulated signal.

FIG. 4 of the drawings shows the spectrum of a conventional FM facsimile transmission system, at a time when the scanning of the image is assumed to be producing sinusoidal variations, from full black to full white, at a rate of 1,600 Hz. Note that the PEM carrier is then at the frequency having the mean period, 1860 Hz., (not the mean frequency half-way between 1,500 and 2,450 Hz. as it would be in an FM system). Under these example conditions, the lower sideband appears at 260 Hz. (i.e., 1860 Hz. minus 1600 Hz.). The upper sideband component (not shown) appears at 3,460 Hz., but is lost during transmission, being well outside the upper limit of the passband of the telephone facility.

The spectrum of FIG. 4 is an oversimplified example. The single carrier at 1860 Hz. and the lower sideband at 260 Hz. was based on an assumed sinusoidal baseband signal of constant frequency (1600 Hz.). Though this hardly conveys any picture of a true facsimile signal, it is useful for purposes of analysis. Because the baseband signal itself can be broken down, by Fourier analysis, into the sum of a constant term (the DC content of the baseband signal), and a sum of sinusoids, one can complete the analysis of any actual signal specturm by placing the carrier at a frequency dictated by the D.C. content of the baseband signal, together with sidebands corresponding to each frequency component of the baseband signal in their proper position relative to the carrier.

Yet even this approach is somewhat misleading, in that it tends to portray the baseband signal as having a spectrum which is uniform over time. In fact, however, the character of the spectrum is dependent only upon the nature of the image being scanned. Consider for example, the nature of the baseband signal produced by scanning a document (such as one of the sheets of drawings forming a part of this patent specification) which is composed of almost completely white background with perhaps less than 1 percent of its total area at the black level. The corresponding FM signal therefore comprises a substantially continuous 1500 Hz. white tone which is only occasionally interrupted by brief upward swings to 2450 Hz. —unless, of course, the horizontal scanning happens to track with a horizontal black line, under which conditions the transmitted tone may suddenly stay at 2450 Hz. for a substantial period of time.

Quite different from this, the baseband signal produced by the scanning of a typical photograph may vary rather slowly from one gray level frequency to another, anywhere in the range between 1500 and 2450, with occasional abrupt changes to other levels at the edges of objects depicted in the photograph.

Figure 5:
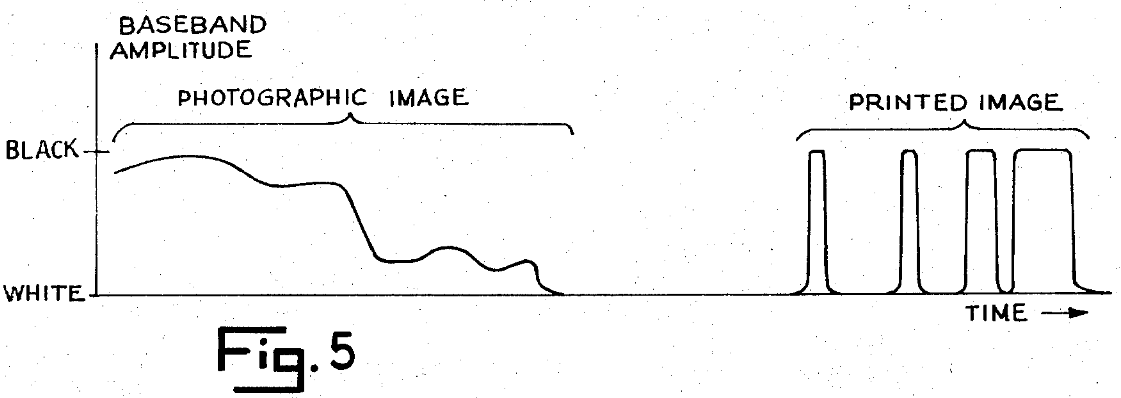
FIG. 5 is a waveform diagram showing the contrast between baseband signals produced by the scanning of photographic and printed images.

Viewed from the standpoint of the differing waveforms of the baseband signal, the difference between photographic and printed images is illustrated in FIG. 5 of the drawings. The baseband signal for photographic images is often characterized by smooth transitions through the scale as well as abrupt transitions between gray levels. For photographic images, each gray level must be reproduced with accuracy, if an acceptable replica of the original photograph is to be achieved. The baseband waveform for printed copies is quite different. Only black and white levels need by transmitted, but the timing of the transitions must be sent with accuracy in order to obtain the needed resoluion.

Where it can be determined, by inspection, that the image to be transmitted is composed almost entirely of full black and full white levels, (e.g., printed or typewritten text, black line drawings, charts, etc.), the signal processing system may be pre-adjusted to optimize the quality of transmission for just such images. Where, however, the document is composed of images of both the photographic and printed type, the transmission system should be capable of accommodating itself to both.

In accordance with a principal feature of one aspect of the present invention, the baseband signal from the scanning transducer at the transmitter is passed through an adaptive network having a transfer function which changes with the changing frequency and amplitude of the baseband signal being handled, and changes in such a way as to greatly improve the transmission of printed materials and the like, while preserving the ability to accurately reproduce images of the photographic type.

Viewed from the standpoint of the frequency spectrum of the transmitted signal, the photographic image tends to produce a widely varied spectral content including a substantial number of low frequency components (sidebands near the carrier frequency) as well as occasional high frequency edge components (sidebands near the lower limit of the telephone passband).

In the case of printed documents, the significance of the sideband components near the lower end of the telephone passband is greatly increase, because it is these components which, when detected, produce the high frequency baseband signals needed for adequate resolution of the srequent sharp black-to-white (and vice versa) level transitions.

Improved speed and quality of facsimile transmission is achieved in accordance with the teachings of the present invention by improvidng the ability of the system to transmit signals near the lower limit of the telephone passband, by processing the baseband signals to accentuate its critical high amplitude and high frequency components thereof, and by increasing the D.C. content of the baseband signal to effectively shift the carrier frequency upward in the spectrum, thus shifting the lower sideband upwardly with the carrier and into the telephone passband in order to improve the system's response to such sidebands. In addition, by eliminating the upper sideband signal at the receiving station, thus eliminating interference between the upper and lower sidebands due to the dispersive delay characteristics of the facility, by amplitude shaping of the baseband signal at low frequencies to improve gray scale response, and by other techniques to be more fully explained in connection with the detailed description to follow, the present invention makes possible a significant improvement in the speed and quality of facsimile transmission.

DETAILED DESCRIPTION OF THE INVENTION

Figures 6, 6A:
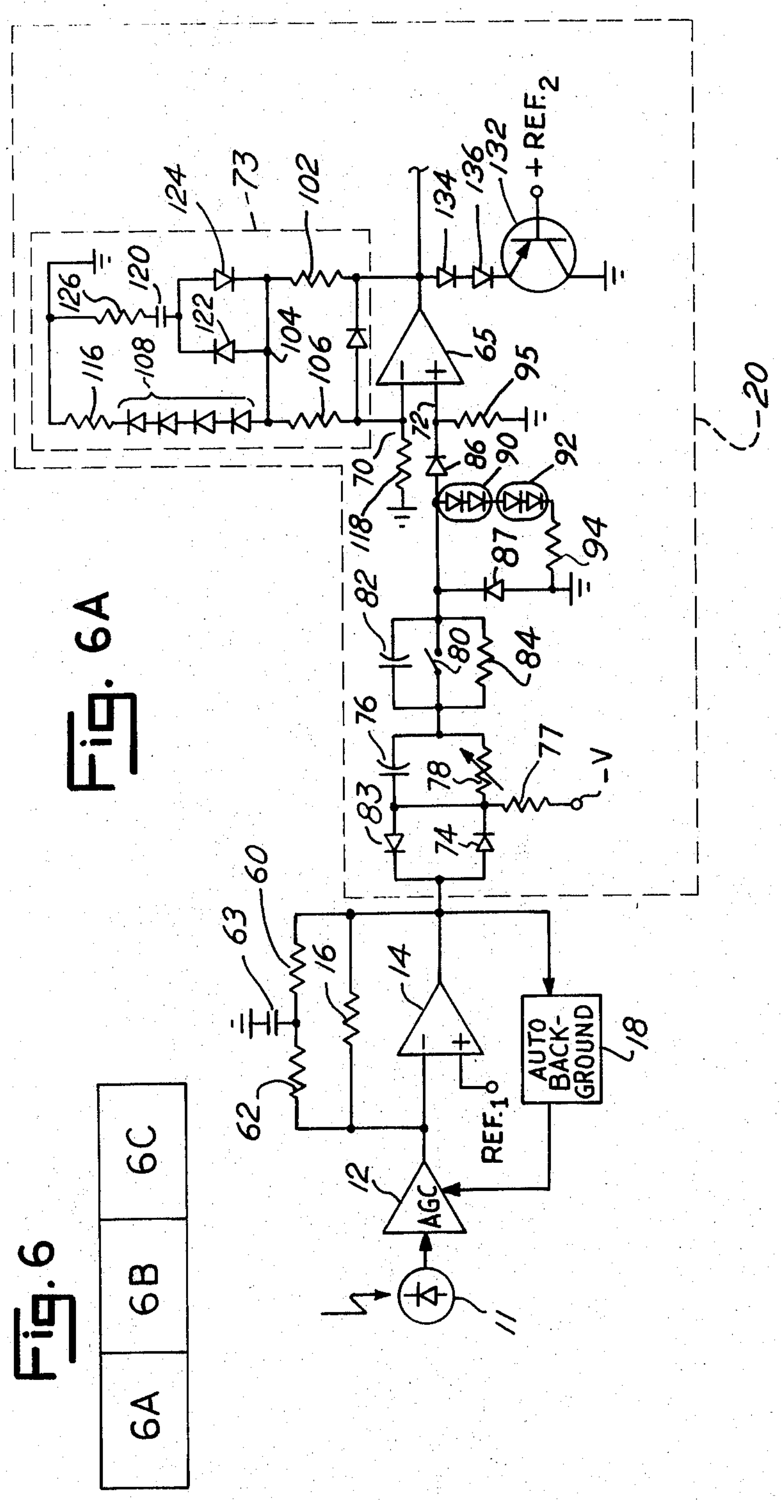
FIG. 6, made up of parts 6A through 6C, is a more detailed schematic diagram of the transmitter section of a facsimile system employing the principles of the present invention.
Figure 6B:
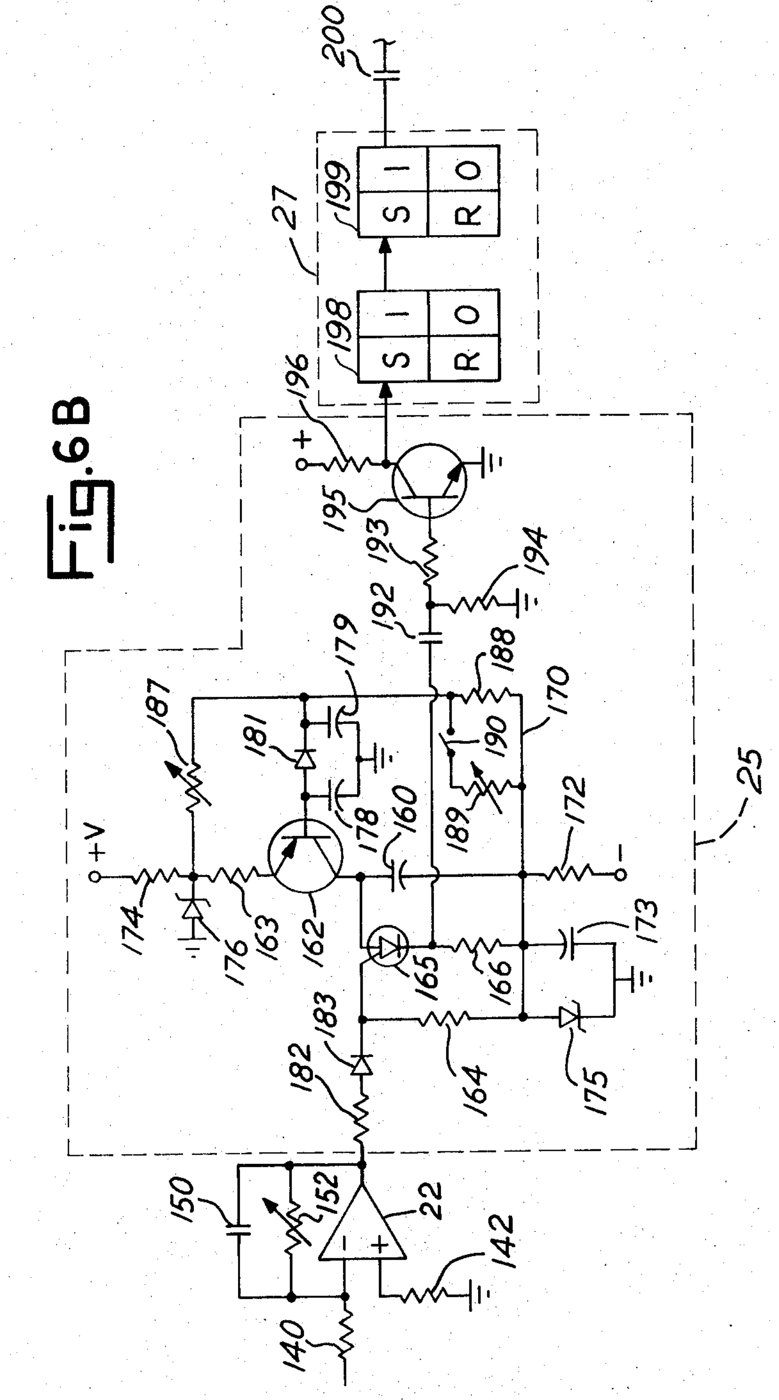
Figure 6C:
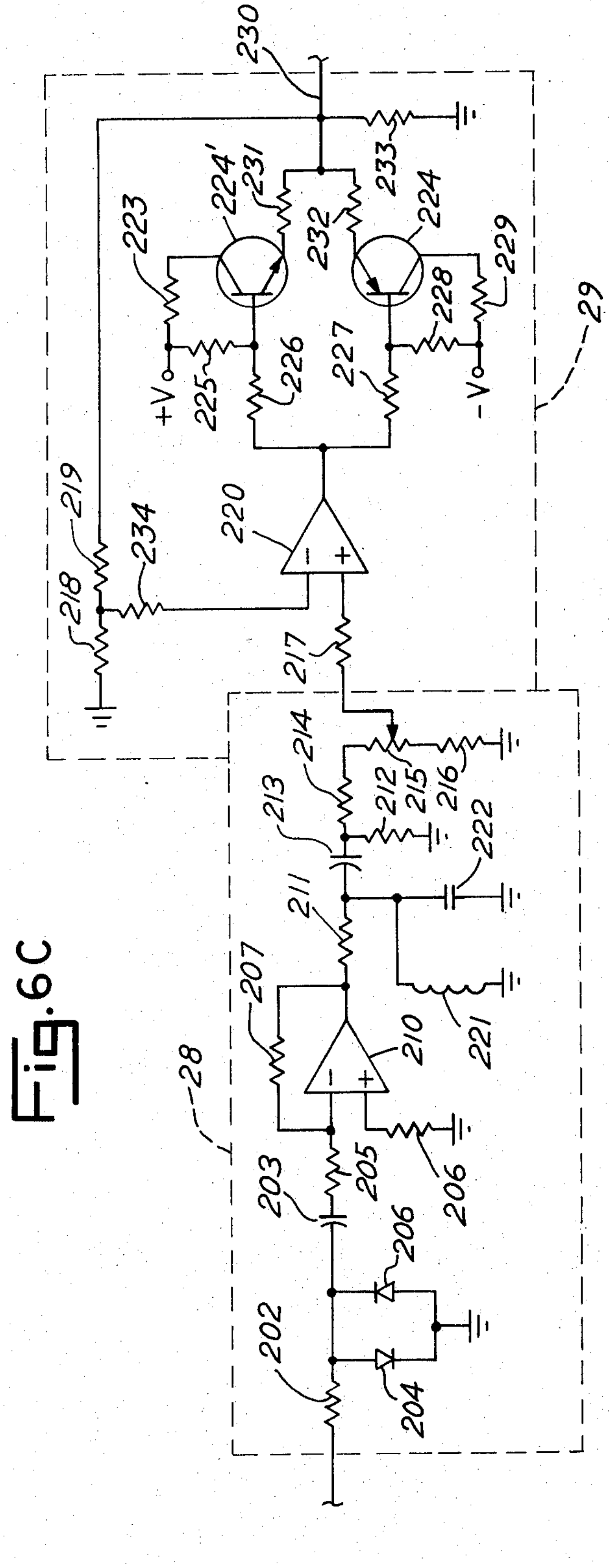

FIG. 6 of the drawings, which is composed of three parts on three sheets designated FIGS. 6A, 6B and 6C, depicts the transmitter section of the facsimile system embodying the principles of the present invention. FIG. 6 shows in more detail the arrangement already depicted in block form in FIG. 1 of the drawings, and like reference numerals are used in both FIGS. 2 and 6 to designate like portions of the transmitter.

As previously discussed in connection with FIG. 1, the reflected light from a document being scanned is detected by the photodiode 11, the electrical signal produced is amplified by the amplifier 12 whose gain is controlled by the automatic background circuit 18, and the output signal thus produced is inverted and added to a constant voltage by the operational amplifier 14.

One portion of the circuit of FIG. 6A, not shown in the simplified FIG. 1 of the drawings, comprises the negative feedback path comprising the serially connected resistors 60 and 62, the junction of which is connected to ground through a bypass capacitor 63. The effect of this additional feedback circuit is to reduce the negative feedback around operational amplifier 14 as the frequency of the signal being handled increases, thus enhancing the high frequency components of the baseband signal.

An automatic background control circuit of the type which may be employed in connection with the present invention is described in U.S. Pat. application Ser. No. 803,609, filed Mar. 3, 1969, by William E. Richeson, Jr., now U.S. Pat. No. 3,600,506, entitled "Background Sensing and Black Level Setting Circuit."

The details of an adaptive, non-linear, baseband signal processing network, the general characteristics of which have been previously discussed, is shown inside the dashed-line outline 20 on FIG. 6A. A circuit somewhat similar in its desired results, but having a substantially different configuration and characteristics in particular the fast recovery nature of the edge enhancement and the exact transfer characteristics, is described in U.S. Pat. application Ser. No. 825,230, filed May 16, 1969, by William E. Richeson Jr., now U.S. Pat. No. 3,622,699, entitled "Facsimile System With Pre-Emphasis Varied by Signal Rate."

The adaptive network 20 shown in detail in FIG. 6A employs, as its principal active element, an operational amplifier 65. As will be seen, in fact, the facsimile system to be described makes extensive use throughout of the versatile operational amplifier for a variety of signal processing operations, made possible by high gain and low output impedance along with inverting and noninverting input terminals. Now readily available as low-cost, integrated circuit package, the operational amplifier design employed in this embodiment yields high performance at low unit cost.

The network 20 is designed to provide thresholding edge enhancement (that is, sufficiently large and abrupt changes in gray-scale level are enhanced with respect to smaller, and less abrupt changes). Moreover, stable operating levels are secured for near-black and near-white signal levels, and fast recovery from past events is insured.

Video signals are supplied to the network 20 from the output of amplifier 14. These video signals have an amplitude which is indicative of the reflected light from that portion of the document being scanned. At the input to network 20, a zero-volt or ground-level signal is indicative of white, and a positive seven (+7) volt signal is indicative of full black, the intermediate signal range between 0 and +7 being indicative of varying shades of gray.

The operational amplifier 65 has two inputs: a negative or inverting input 70 and a positive or non-inverting input terminal 72. A non-linear feedback network 73 is connected between the output of amplifier 65 and its inverting input 70.

Positive-going input signals from amplifier 14 flow through forward biased diode 74, the parallel combination of capacitor 76 and variable resistor 78, and either the closed mode selecting switch 80 or, if switch 80 is open, the parallel combination of capacitor 82 and resistor 84, to the anode of diode 86 whose cathode is connected to the non-inverting input 72 of amplifier 65.

Switch 80 is employed to decrease the required signal level to cause the circuit to produce a saturated black level print mode by further increasing sensitivity and controlling the high-frequency response of the network 20 when printed (as opposed to photographic) images are to be transmitted with a controlled level of edge enhancement. The parallel resistor 84 and capacitor 82 increase the attenuation of low-frequency signals to the amplifier 65 in the photo mode even more than the lowfrequency attentuation already provided by the parallel combination of capacitor 76 and resistor 78, which remain in the input circuit for the print mode when switch 80 is closed. Each mode has a controlled amount of edge enhancement.

A prior form of switchable mode control is set forth in applicants' earlier U.S. Pat. application, Ser. No. 803,612, filed Mar. 3, 1969, by William E. Richeson, Jr. and Robert Dreisbach, now U.S. Pat. No. 3,622,698, entitled "Facsimile System With Selective Contrast Control".

In the network 20, the circuit including diodes 74 and 83 along with bias current via resistors 77, 78, 84 and diodes 87, 86 and resistor 95 effectively blocks low level signal variations near the white level.

When voltage at the anode of diode 74 is at a low level (below .6 volts if the diodes are silicon), diode 87 still conducts current through resistor 77 to the −18 volt voltage source, thus holding its cathode negative because of the voltage drop across the diode. The negative voltage at the cathode of diode 87 back biases diode 86 and, if the anode voltage on diode 74 is great enough, causes diode 86 to conduct. Diode 87 therefore functions to set the thresholding effect of the anode of diode 86 (and has another function as well, which will be explained later). Accordingly, when low input voltages are applied to network 20, no signal reaches input terminal 72 of amplifier 65, and therefore the output voltage at the output of amplifier 65 is held to zero. As a result, when the video signals from amplifier 14 are near the zero volt range, indicating that a white or near-white portion of the document is being scanned, the signal at output terminal 44 is maintained at the zero level, blocking small signal variations or gray hash.

As the input voltage from amplifier 14 increases above this first predetermined level, both diodes 74 and 86 conduct, while diode 87 terminates conduction, thus allowing input signals greater than the first predetermined level to pass through to the input terminal 72 of the amplifier 65. The effect of this circuit is to render the background of the reproduced document white yielding a clean background even when the document to be copied is somewhat smudges or dirty.

The network 20 also includes a non-linear gain controlling circuit connected between the anode of diode 86 and ground. This non-linear circuit, which includes two serially connected pairs of diodes 90 and 92 and a resistor 94, shunts a portion of the signal away from the amplifier input terminal 72, when the input is above a predetermined value varying the overall transfer gain of network 20. Diode pairs 90 and 92 do not conduct until the voltage across them reaches a level just above that required to cause diode 86 to conduct. As the voltage exceeds this level, diode pairs 90 and 92 go into conduction gradually, causing the gain of the network 20 to be gradually reduced in the region indicated by the letter X in FIG. 1B of the drawings.

The negative feedback network 73, connected between the output amplifier 65 and the negative (inverting) amplifier input terminal 70, reintroduces a portion of the signal at the amplifier output as a negative feedback signal, the amount of negative feedback being a non-linear function of both the amplitude and frequency of the signal being processed.

First, any negative signal applied to input terminal 72 (including negative-going recovery transients on black to white transitions and noise impulses which may exist even when diode 86 is back biased) cause the diode 100 to conduct, thus effectively removing all negative ("whiter-than-white") signals.

In the negative feedback network 72, a first resistor 102 is connected between the output of amplifier 65 and a node 104, and a second resistor 106 is connected between node 104 and inverting amplifier input terminal 72. Four identically poled diodes 108 are serially connected with a resistor 116 and between node 104 and ground. Resistors 102 and 106 form a feedback path, and the combination of diodes 108 and resistor 116 has little or no effect on the feedback until the amplitude of the signal at node 104 reaches a third predetermined level, great enough to initiate conduction through these diodes. As the conductivity of the diodes 108 increases, an increasing portion of the negative feedback is shunted to ground. Therefore, the gain of the network 20 gradually increases, in an exponential fashion, as the amplitude of the signal being processed increases, as illustrated by the region Y in FIG. 1B of the drawings.

The network 20 also provides decreased negative feedback for higher frequency, higher magnitude components of the video signal. Capacitor 120 is connected in series with a pair of oppositely poled, parallel-connected diodes 122 and 124 and a resistor 126 between node 104 and ground. CApacitor 120 blocks low frequency signals, while diodes 122 and 124 block low amplitude signals, whereas higher frequency, higher amplitude negative feedback signals are shunted to ground through resistor 126. The effect of this portion of the network, together with the effect of capacitors 63, 76 and 82, creates the family of transfer curves for increasing frequency illustrated by the curves of FIG. 1B.

Diodes 86, 87, 100 and 124 provide an advantageous shortening of the response time of network 20. It may be noted that capacitors 76 and 82 are charged by positive input signals from amplifier 14. Without diodes 86 and 87, when the input signal level abruptly drops (in a negative-going direction), these capacitors could only discharge through resistors 78 and 84, because reverse currents could not flow through diodes 74, 86, 90 and 92. Diodes 86 and 87 provide a low impedance discharge path for these capacitors, however, thus reducing the tendency toward whiter-than-white overshoot, nd placing the network 20 in condition to pass the full strength of the next white-to-black (positive-going) voltage transition, which could occur immediately following a rapid black-to-white transition.

Diode 124 provides a similar improvement in the recovery time of capacitor 120 in feedback network 73. Note that, unless diode 124 is included, diode 122 would trap charge on capacitor 120. In this connection, it should be noted that decreasing the value of resistor 126 both speeds recovery time and increases "edge enhancement" through decreased negative feedback at higher frequencies. Increasing the values of capacitors 76, 82 and 120, increases edge enhancement while slowing recovery time. Diode 100 prevents whiter-than-white overshoots whose source is a function of distributed capacitance as well as operational amplifier limitations. By appropriate selection of these values, therefore, the overall response of network 20 may be adjusted for improved edge enhancement (by accentuating high frequency components of the baseband signal) yet that response time is nevertheless sufficiently slow that network 20 does not respond to frequencies beyond the passband. Thus, network 20 also acts as a low-pass filter and is effective to suppress the creation of "negative frequency" sideband components in the transmitted, frequency modulated signal which would be detected as spectral foldback noise.

Finally, network 20 includes an accurate black level clamp which limits the output voltage from amplifier 65 to levels no greater than a predetermined level (e.g., +7 volts, the nominal black level). This black level clamping circuit includes a transistor 132 having its emitter connected through serially connected diodes 134 and 136 to the output of amplifier 65. The base of transistor 132 is connected to a source of an accurate, positive reference voltage whose magnitude is slightly less than the nominal black clamping level.

When the voltage at the output of amplifier 65 reaches the clamping level, the emitter-base function of transistor 132 becomes forward biased, causing conduction through diodes 134 and 136. (Diodes 134 and 136 are included to prevent changes in ambient temperature from affecting the voltage level at which conduction is initiated, the sum of the temperature coefficient characteristics of diodes 134 and 136 being equal in magnitude to, but opposite in direction to, the temperature coefficient of the emitter-base function of transistor 132 and the reference voltage source.) Accurate black level clamping is important because the magnitude of the black level baseband signal establishes the upper frequency limit of the transmitted tones, which cannot be permitted to approach the line knockdown frequency of the telephone facility.

Adjustment of the value of the variable resistor 78 in network 20 controls the low frequency gain characteristics of the network. As shown in FIG. 1B of the drawings, it is desireable to adjust resistance 78 such that the output voltage from operational 65 saturates (that is, reaches its 7 volt upper limit) when the input voltage from amplifier 14 is slightly less than 7 volts. In this way, small signal variations very near the black level are treated as full black, this eliminating gray hash on large black image areas.

The operational amplifier 22 shown in FIG. 6B of the drawings, buffers the output from the transfer network 20 and, in addition, acts as an additional low-pass filter, further suppressing the creation of spectral foldback interference. The parallel combination of capacitor 150 and variable resistor 152 connected between the output and the inverting input of operational amplifier 22 provide increased negative feedback at higher frequencies, and thus reduce the gain of amplifier 22 as frequency increases. The variable resistance 152 permits gain adjustments to be made such that the baseband signal continues to span the range from 0 to 7 volts in magnitude (although the signal excursion is now from 0 to −7 volts by virtue of the fact that operational amplifier 22 inverts the signal).

The signal from amplifier 22 is employed to control the time duration between impulses produced by the amplitude-to-period modulator 25 shown in FIG. 6B of the drawings.

In the modulator 25, a timing capacitor 160 is charged by means of a constant current source including transistor 162. Consequently, the voltage across capacitor 160 increases in a linear fashion until that voltage is approximately equal to the input voltage supplied from amplifier 22. When the increasing voltage across the timing capacitor 160 reaches the input voltage level, programmable unijunction transistor (PUT) 165 "fires", discharging capacitor 160 through resistor 166 to near zero voltage, at which time rectifier ceases conduction and capacitor 160 again charges linearly toward the input voltage level. The voltage impulses thus appearing across resistor 166 are spaced apart in time by an amount directly proportional to the magnitude of the signal from amplifier 22.

In the period modulator 25, a number of steps are taken to insure the frequency stability of the signal produced. The negative voltage which appears on bus 170 is held at a fixed potential by the combination of resistor 172 which connects bus 170 to a source of a negative potential and by Zener diode 175. In like manner, the voltage at the junction of resistor 163 and 174 is held at a fixed positive level by Zener diode 176 connected from that junction to ground. Capacitors 178 and 179 prevent high frequency noise signals from appearing at the base of transistor 162, and diode 181 compensates for any change in the temperature coefficient of the base-emitter junction of transistor 162.

Although the signal from amplifier 22, applied to the gate terminal of rectifier 165 through the series combination of resistor 182 and diode 183, (diode 183 and resistor 182 assists in temperature compensating the PUT) varies between 0 and −7 volts (for black), the voltage appearing at the gate electrode of the PUT 165 is positive with respect to the voltage at its cathode by virtue of the fact that the voltage at bus 170 is more negative than minus 7 volts.

The magnitude of current flowing through transistor 162 to charge the timing capacitor 160 may be varied by adjusting resistor 187, an increase in this resistance causing an increase in charging current. The series combination of variable resistor 189 and mode selecting switch 190, which are connected in parallel between the cathode of diode 181 and bus 170, provides a means for further increasing the charging rate of capacitor 160, thus reducing the time duration between output pulses produced across resistor 166. In this way, the minimum and maximum pulse repetition rates for a given baseband signal range may be independently adjusted (so that different period excursions of the PEM can be selected for different machine running times).

The amplitude-to-period modulator, as has been seen, in effect samples the baseband waveform from amplifier 22, converting each sample amplitude into a period between impulses.

In the present embodiment, the constant current source which charges timing capacitor 160 is adjusted such that the sampling rate varies from a minimum of 6,000 samples per second to a maximum of 9,800 samples per second when switch 190 is open, and from 7,600 to 9,800 samples per second when switch 190 is closed.

The impulses from the amplitude-to-period modulator 25 are applied to a pair of cascaded flip-flops 198 and 199 which make up the binary frequency divider 27. Each impulse from the transistor 195 sets (or resets) the flip-flop 198 whose output in turn sets or resets flip-flop 199. As a result, the waveform applied to the capacitor 200 at the output of flip-flop 199 is a variable period, square waveform signal of reduced frequency. The time duration separating the zero crossings of this square wave-shaped signal is accordingly the sum of two successive time durations separating the adjacent pulses produced by the modulator 25.

The operation of the amplitude-to-period modulator 25 at a high frequency, followed by subsequent frequency division to the desired frequency, provides significant advantages. First, the accuracy with which the input waveform is sampled is increased by increasing the charging rate on capacitor 160 (and the number of samples of a given video rate can be n times per video frequency component so as to stay above the Nyquist sampling rate). At lower charging rates, as the maximum rate of change of the input signal approaches the charging rate on capacitor 160, the timing of the crossover point (at which time the voltage at the collector transistor 162 exceeds the signal voltage) may be changed markedly by even small errors in the charging rate, or by even small amounts of noise superimposed upon the input signal.

The combination of modulator 25 and the frequency division circuit 27 may be considered a sampling circuit; that is, the information in the original wave form is entirely contained in the timing of each half cycle of the square wave output signal. Thus, for signals near the white level, 3,000 samples per second of the input signal are transmitted, whereas, for signals near the black level, 4,900 samples per second are transmitted. In accordance with the so-called Nyquist criteria, the highest frequency component of signal waveform which may be successfully transmitted by any sampling system is that frequency equal to one-half the sampling rate. Thus, for white level signal variations, the maximum frequency component which can be recovered at the receiver is at 1,500 Hz., whereas for black level variations, the maximum recoverable signal frequency is 2,450 Hz.

Such a consideration of the system from the sampling standpoint merely verified, of course, what was also apparent from a consideration of this system from an analysis of the spectrum of the transmitted signal: baseband frequency components whose frequencies are greater than the effective mean carrier frequency of the transmitted signal are converted into untransmittable negative frequency components. Viewed as a sampling system, the transceiver is incapable of communicating these high-frequency baseband components because the sampling rate is too low. From either standpoint, it is clear that any shift of the carrier frequency upward (toward the black level, or any increase of the sampling rate which accompanies a shift towards the black level, can be expected to improve the high-frequency response of the system. This is, of course, precisely what the adaptive network accomplishes. High-frequency baseband signals are emphasized in non-linear fashion in such a way that their direct current content in increased, effectively increasing both the transmitted carrier frequency and the sampling rate.

The square-wave, period-modulated signal from the divider 27 passes through capacitor 200 (shown at the extreme right on FIG. 6B) to emphasis circuit 28 and pre-equalizer circuit 29 shown on FIGS. 6B and 6C of the drawings. The input signal to pre-emphasis circuit 28 passes through resistor 202 and is peak limited by diodes 204 and 206 before being amplified by the circuit including operational amplifier 210 (so as to remove level fluctuatings of the prior flip flops). The output of operational amplifier 210 is connected to a circuit comprising the combination of resistance 211, capacitor 213, fixed resistor 214, potentiometer 215, and resistance 216, all of which are connected in series between the output of operational amplifier 210 and ground. The parallel combination of a capacitor 222 and an inductor 221 are connected between the junction of resistor 211 and capacitor 213 and ground. The effect of the preemphasis circuit 28 is to provide increased gain in the region neighboring the resonant frequency of inductor 221 and capacitor 222, to develop system pre-equalization, and to decrease the gain above that frequency as capacitor 222 shunts increasing portions of the energy to ground at a rate approximately equal to 6 db per octave of emphasis.

As heretofore discussed, emphasis of the low-frequency components of the signal to be transmitted over the telephone facility is required, because particularly important components of the signal exist at these low frequencies whose signal-to-noise level must be maintained, but in addition because the pre-equalization of the signal is desired to overcome the attenuation by the telephone facility increases markedly in this low-frequency range, although the increased attenuation is not necessarily accompanied by a corresponding decrease in line noise, primarily because of the likelihood of noise due to low-frequency harmonics of 60 Hz. A.C. power being coupled to the telephone transmission channel exists anywhere along the telephone line.

The magnitude of the signal from the pre-equalization circuit 29 and the emphasis circuit 28 having been adjusted by means of potentiometer 215, the signal to be transmitted is then passed to a power amplifier 29 comprising an operational amplifier 220 driving a pair of complementary transistors 224' and 224 connected in a conventional configuration. Positive going signals from the output of operational amplifier 220 drive transistor 224' into conduction, thereby driving output conductor 230 positive, while negative going signals from operational amplifier 220 drive transistor 224 into conduction, thereby driving output conductor 230 negative. For improved performance, negative feedback is applied from output conductor 230 to the inverting input of operational amplifier 220 through a resistive feedback network comprising resistors 218, 219, and 234. As previously shown in FIG. 1, the power amplifier 30 is connected to drive an audio tone generator or speaker acoustically coupled to the microphone section of a conventional telephone handset 33 or can drive a data access arrangement.

The details of the receiving section of the facsimile transceiver embodying the principles of the present invention is shown in detail in FIGS. 7A through 7D of the drawings.

At the receiving station, tones from the telephone line are picked up by a microphone transducer 37 acoustically coupled to earpiece of a standard telephone handset. Alternatively, transducer 37 may be inductively coupled to the magnetizing coil of the telephone earpiece. The microphone 37 possesses a balanced-line output and is connected to the input of a high-pass filter network 40 (emphasis circuit) which has a balanced-line input. The high-pass filter network 40 restores the high-frequency components of the received signal, the transfer gain of the network increasing at the rate of approximately 6 db per octave, a rate equal in magnitude to, but opposite in direction from, the low-pass characteristics of emphasis network 28 in the transmitter over the frequency range from approximately 720 Hz. to the upper limit of the telephone passband, approximately 3,000 Hz., as shown in FIG. 2A.

The operational amplifier 240 amplifies the signal and converts it to a single-line unbalanced output applied through the capacitor 242 to the input of gain controlled amplifier 250 in AGC circuit 41. The gain of amplifier 250 is decreased as the voltage on control conductor 252 increases. This control voltage is supplied by operational amplifier 255, that voltage being proportional to the detected positive peak voltages existing at the output of operational amplifier 257.

The AGC circuit 41 is employed to advantage, even though the signal to be received may be thought of as a frequency modulated signal, because the received signal in fact has substantial amplitudemodulated content which, if standardized before further processing, improves the performance of the receiver by minimizing non linearities and hence damaging cross-product spectral components.

The output of the AGC circuit 41 is connected to the input of an equalizer 44, of standard design, which provides phase and amplitude equalization for a statistically predicted standard telephone link. As mentioned earlier, however, it should be recognized that few transmission links will in fact exhibit standard phase and amplitude characteristics, so that imperfect equalization is to be expected and, as will be seen, is to be taken into account during further processing of the signal in the receiver.

The signal from equalizer 44 is passed through an upper sideband filter 46, and M-derived low-pass filter of standard design having a cutoff at 2,800 Hz. The affirmative removal of upper sideband information at the receiver is a first example of precaution being taken against poor equalization. Upper sidebands spaced by considerable distance (in frequency) from their lower sideband counterparts may interfere with these lower sidebands if substantial phase differences between the two, due to imperfect equalization, exist. The effect is in essence due to the folding together of the sidebands by detection processes. If the delay is not the same for respective modulation components interference is created in the desired detected video. Accordingly, upper sideband components above 280 Hz. are entirely removed. As will be seen later, the removed upper sideband components as received are replaced by artificial upper sidebands, these being exact reflected versions of the lower sidebands, during the process of hard-limiting of the received signal so as to allow for a double sideband detection process.

The output from the upper sideband filter 46 is applied to an amplifier and line-noise filter 260. This filter includes operational amplifier 262 which, with its associated circuitry, forms an active two-pole filter of conventional design employed to remove 60 Hz. line noise (interference) from the signal being processed. Further suppression of line-noise is accomplished by capacitor 263 connected between the output of amplifier 262 and the input of amplifier 257, and by capacitor 265 connected in series with the output of amplifier 257.

Figures 7, 7A:
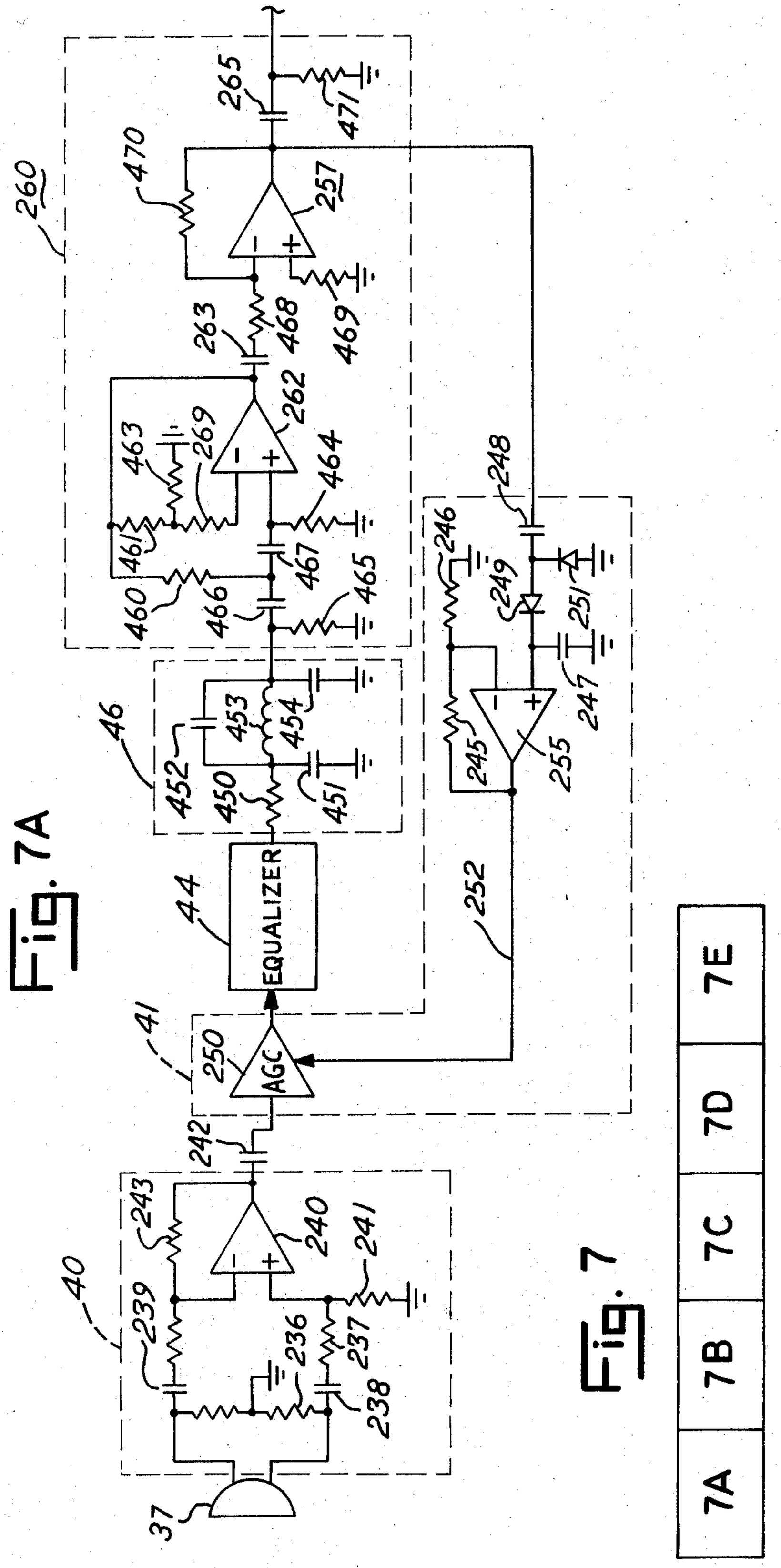
FIG. 7, made up of parts 7A through 7E, is a more detailed schematic diagram of the receiver section of the facsimile transceiver.
Figure 7B:
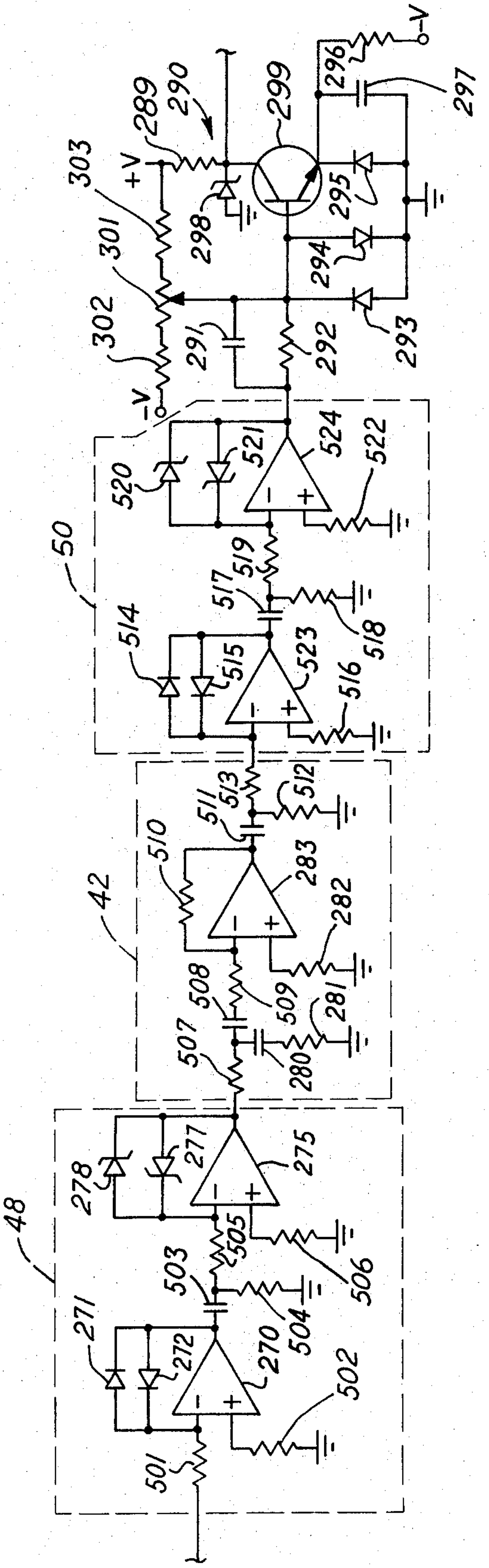

The output from amplifier-filter 260 is applied to the input of a first hard limiter circuit 48, shown in FIG. 7B. Limiter 48 comprises the first operational amplifier 270 in which two back-to-back diodes 271 and 272 are connected between the output and the inverting input of operational amplifier 270, providing 100 percent negative feedback for any signal, as amplified by amplifier 270, whose positive amplitude is greater than, or whose negative amplitude is greater than, the breakdown potential of the two feedback diodes. In effect, therefore, the operational amplifier 270, with its feedback diodes, eliminates most information from the incoming signal except the identity of the zero crossings.

The output from amplifier 270 is passed to a second circuit including operational amplifier 275, similar in configuration to the circuit including amplifier 270, except that the feedback diodes employed are Zener diodes 277 and 278, which exhibit a greater forward breakdown potential. Thus, the amplifier 275 provides a square-wave output whose peak-to-peak amplitude is equal to the sum of the breakdown potentials of the two Zener diodes 277 and 278, at this point essentially only information relative to zero crossings exists in the output signal.

The output from the first limiter circuit 48 is applied to the input of a low band, post-equalizer network 42. The presence of the series combination of capacitor 280 and resistor 281, connected between the input circuit to operational amplifier 283 and ground, is to increase the gain of the post-emphasis network 42 for frequencies below approximately 720 cycles per second until, at approximately 360 Hz., the effective gain of the network has doubled. This low-frequency equalization acts additively with the low-frequency equalization provided by the pre-equalization circuit 29 of the transmitter (more particularly, with the low-frequency hump of the gain curve shown in the FIG. 1D of the drawings). From the waveform standpoint, the effect of post-equalization circuit 42 is to correct the positioning of the zero crossings where that positioning has been distorted by low-frequency attenuation in the telephone transmission facility.

According to one feature of the present invention, post-equalization correction is accomplished after, rather than before, hard-limiting, in order to prevent a phenomenon termed sideband capture which can occur when telephone facilities having unexpectedly good low-frequency transmitting capabilities are used. This results in over-equalization of the low-frequency components and can cause the low-frequency sideband to be so large in comparison to the carrier that occasional zero crossings of the carrier do not occur, leading to gross errors on detection. By limiting the post equalization to a given level, however, the tendency toward sideband capture is minimized. After a given limiter and prior to the next limiter additional post equalization without side band capture is possible.

The signal from post-equalizer circuit 42, being no longer a pure square-wave, is again hard-limited by the limiter 50 whose configuration is basically that of a limiter 48 already discussed. Limiter 50 produces a square-wave signal which is then applied to the input of a zero-crossing detector circuit 290 in which the base of a transistor 291 is connected to the output of limiter 50 by the parallel combination of capacitor 299 and resistor 292. The voltage-levels applied to the base of transistor 299 are limited by back-to-back clamping diodes 293 and 294. The emitter of transistor 299 is held at a fixed negative reference potential by the positive current flowing from ground through diode 295 and through resistor 296 to a source of negative potential. Capacitor 297, connected between the emitter of transistor 299 and ground, along with diodes 293, 294, 295 serves to maintain a given clipping symmetry in the operation of transistor 299. The voltage appearing at the collector of transistor 299 is limited to a fixed positive value by Zener diode 298 when transistor 299 is non-conducting.

The transistor 299 is switched into conduction when the input voltage from limiter 50 passes a predetermined level determined by the setting of potentiometer 301, which is connected in series with fixed resistors 302 and 303 between sources of positive and negative potentials. It may be noted that transistor 299 turns on when the voltage applied to its base exceeds zero volts, since the voltage across diode 295 is equal to the drop required across the base-emitter junction of transistor 299 to bring it into conduction. The adjustment of potentiometer 301 allows the D.C. level of the square-wave from limiter 50 to be adjusted so that it is centered about zero volts, thus assuring symmetry in the limiting operation when a constant frequency test sine wave is fed to the input terminals de-emphasis circuit 40 shown on FIG. 4.

Figure 7C:
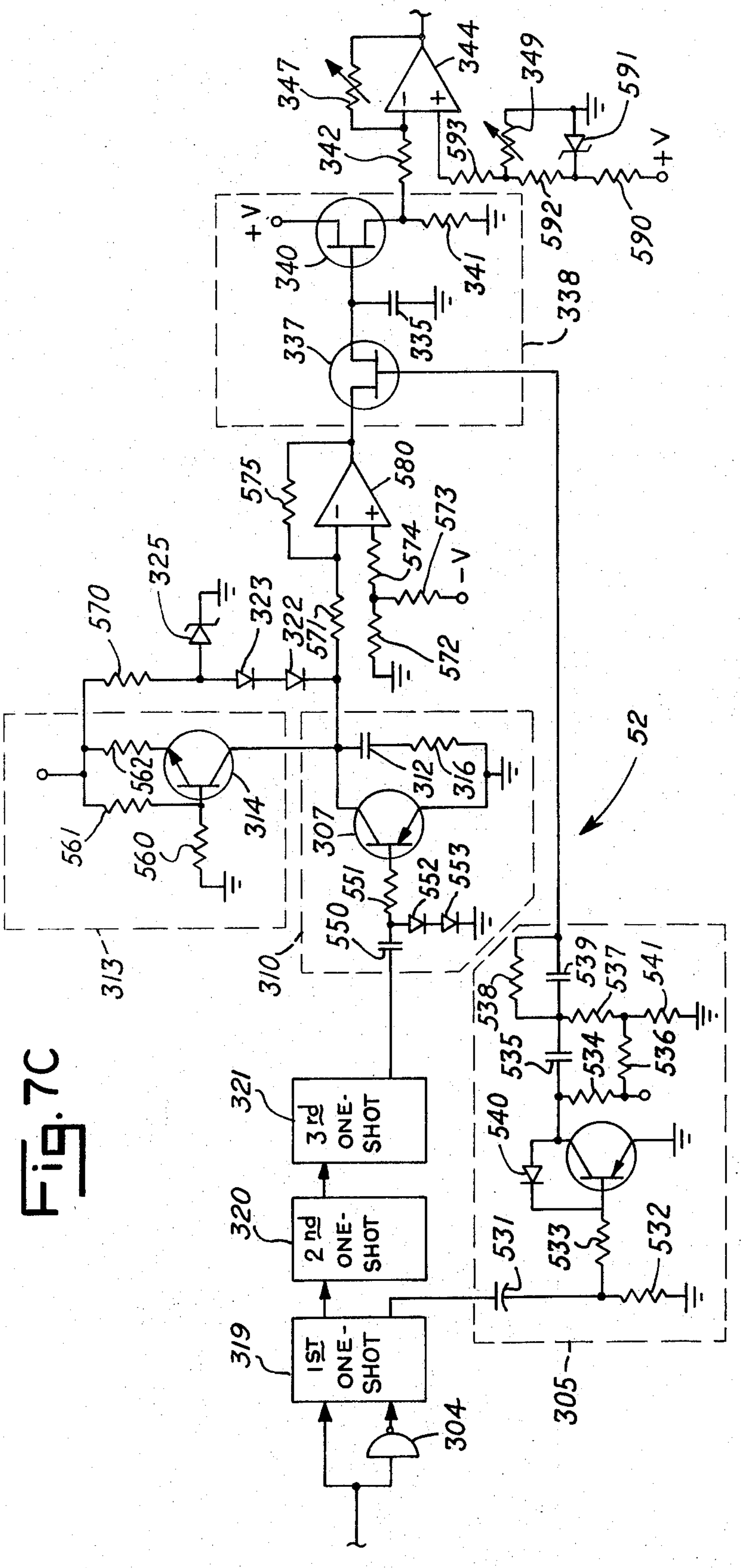

FIG. 7C of the drawings schematically depicts a period-to-amplitude demodulator 52 which converts the square-wave, pulse-width-modulated signal from zero-crossing detector 290 into a replica of the original video baseband signal, the amplitude of this baseband signal being related to the time duration separating the zero-crossings of the signal to be demodulated. Demodulation is accomplished through the initiation of a linearly increasing ramp function at each zero-crossing and a subsequent sampling of the maximum amplitude of this ramp function at the time of the following zero-crossing, holding each sample to produce a stair-step wave form having the general shape of the baseband signal, and finally smoothing this waveform with a low-pass filter to remove the stair-step variations.

As shown in FIG. 7C of the drawings, the square-wave signal from the zero-crossing detection circuit 290 is applied to three, cascaded, one-shot multi-vibrators 319, 320, and 321. The first one-shot multi-vibrator 319, which receives the signal from detector 290, and the inverse of that signal via inverter 304, produces a short duration pulse at each zero-crossing of the signal from the detection circuit 290. A positive-going version of this pulse from one-shot 319 is applied to trigger the next one-shot multi-vibrator 325, while a negative-going version is transmitted to the sample command circuit 305, whose function will be discussed subsequently. The second one-shot multi-vibrator 320 generates an output pulse after a brief delay period following the application of the pulse from one-shot 319, and triggers the third one-shot multi-vibrator 321 which generates a negative-going output pulse employed to turn-on transistor 307 in a ramp generator circuit 310.

Ramp generator 310 operates by charging a capacitor 312 from a constant current source 313 which includes transistor 314. The capacitor 312 is periodically discharged (through transistor 307 and current-limiting resistor 316) each time a negative-going pulse is applied from one-shot multi-vibrator 321. The two diodes 552 and 553, connected between the junction of the resistor 551 and capacitor 550 and ground, limit the amplitude of positive signals applied to the base of the transistor 307. In the same fashion, diodes 322 and 323 prohibited the voltage at the collector transistor 307 from reaching a negative value in excess of the sum of the voltage drop across Zener diode 325 and the forward drops across the two diodes 322 and 323. The sawtooth waveform which appears at the collector of transistor 307 is amplified by operational amplifier 580 whose output is repeatedly connected (momentarily) across holding capacitor 335 whenever the field effect transistor 337 is gated into conduction by a sample command pulse from network 305. The field effect transistor 337, when conductive, either charges or discharges the holding capacitor 335 so that that capacitor holds a voltage proportional to the last peak voltage of the sawtooth waveform across the capacitor 312. representative of duration between the last set of zero crossings of the signal to be demodulated.

One-shot multi-vibrators 319, 321, and 321 cause transistor 337 to be gated into conduction, thus sampling the sawtooth waveform, immediately before transistor 307 is gated into conduction to discharge capacitor 312. Multiple vibrator 321 emits a pulse of sufficient width to insure that capacitor 312 is allowed time to discharge completely. The multi-vibrator 320 delays the application of the discharging pulse so that the voltage across capacitor 312 can be sampled by transistor 337 before that capacitor is discharged.

In the sample-and-hold circuit 338, the voltage across capacitor 335 controls conductivity of a second field effect transistor 340 and the signal thus appearing across resistance 341 is applied through a resistor 342 to the input of an operational amplifier 344, the gain of which is adjustable by varying the resistance of the negative feedback resistor 347. The D.C. content of the signal from operational amplifier 344 is varied by adjusting resistance 349 which controls the constant D.C. signal level to the positive (not-inverting) input of amplifier 344.

Figure 7D:
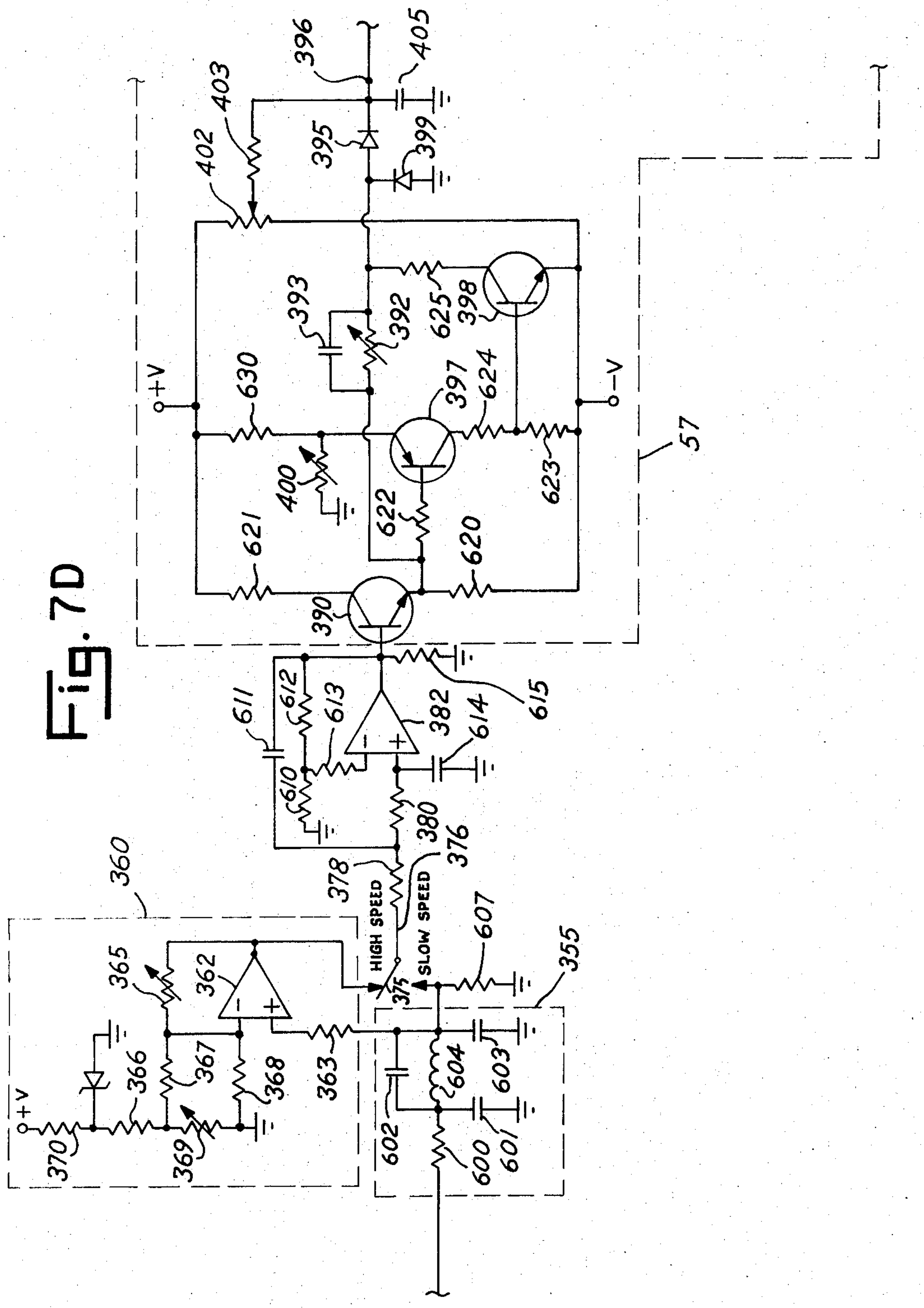

As shown in FIG. 7D of the drawings, the output of amplifier 344 is connected through a resistance 600 to a M-derived low-pass filter 355 which is effective to remove the stair-step variations in the signal created by the sample and hold circuitry, thus providing a smoothed replica of the original baseband signal at its output.

At this point, it should be noted that the signal appearing at the output of the sample-and-hold circuit 338 (that is, the signal applied to the inverting input of amplifier 344) represents white by means of a high-level positive signal and black by a lower-level positive signal. Amplifier 344 inverts this signal and adds it to a constant such that the signal appearing at the output of amplifier 344 represents black by a signal level of approximately +7 volts and white by a signal level of either 0 volts or +3.5 volts, depending upon whether the received signal was created by the transmitter operating in the slow or high-speed modes. It will be remembered that, at the transmitting station, signals in the slow-speed mode exhibited a frequency swing from 1500 Hz. to 2450 Hz. while, in the high-speed mode, a more narrow frequency swing of 1975 Hz. –2450 Hz. was employed. This difference results in two different baseband voltage swings appearing at the output of filter 355.

When signals transmitted in the high-speed mode are being received, it is desirable to convert their more limited voltage swing of detected slow-speed signals. This conversion is accomplished by the high-speed correction circuit 360 which includes operational amplifier 362.

In the high-speed mode, the output signal from low-pass filter 355 is applied through a resistor 363 to the positive (non-inverting) input of amplifier 362. The gain of amplifier 362 may be adjusted by varying the resistance of the negative feedback resistor 365. Resistor 365 is adjusted such that the voltage swing of the signal applied to the positive terminal or amplifier 362 is increased approximately two-fold. Thus, as an example, an applied voltage variation from +3.5 volts (white) to +7 volts (black) would be converted into a voltage swing from +7 volts to +14 volts; however, the simultaneous application of a positive reference signal (from the network comprising resistors 366, 367, 368, 369 and 370) adds a negative constant to the output signal from amplifier 362, shifting its range to 0 to 7 volts, a signal range equivalent to that created when slow-speed baseband signals are detected. The high-speed correction circuit 360 is switched into operation by means of switch 375 which connects output conductor 376 directly to the output of a low-pass filter 355 in the slow-speed mode or, alternatively, to the output of amplifier 362 in the correction circuit 360 in the high-speed mode.

Conductor 376 is connected via resistors 378 and 380 to the non-inverting input of operationsl amplifier 382 which forms part of an active low-pass filter, employed to further filter the carrier signal from the video signal appearing at the output of amplifier 382.

The output of amplifier 382 is applied to the base of transistor 390 whose emitter is connected through the parallel combination of variable resistance 392 and capacitor 393 to the anode of diode 395.

Transistors 397 and 398 are employed to remove small signal variations near the zero (white) level. When the signal level appearing at the emitter of transistor 390 drops to a sufficiently low level, transistor 397 is switched into conduction, in turn switching transistor 398 into conduction and drawing current through diode 399, thus holding the signal level at the anode of diode 395 at a slightly negative potential. As the input signal level to transistor 390 rises to a predetermined point (determined by the setting of a variable resistor 400 which is connected between the emitter of transistor 397 and ground), transistors 397 and 398 cease conduction, no longer drawing current through diode 399, and permitting signal variations to be transmitted through diode 395 to the output conductor 396.

The combination of potentiometer 402, resistor 403 and diode 395 allows the background white level signal to be adjusted under near white signal conditions when diode 399 is conducting and diode 395 is blocked.

Figure 7E:
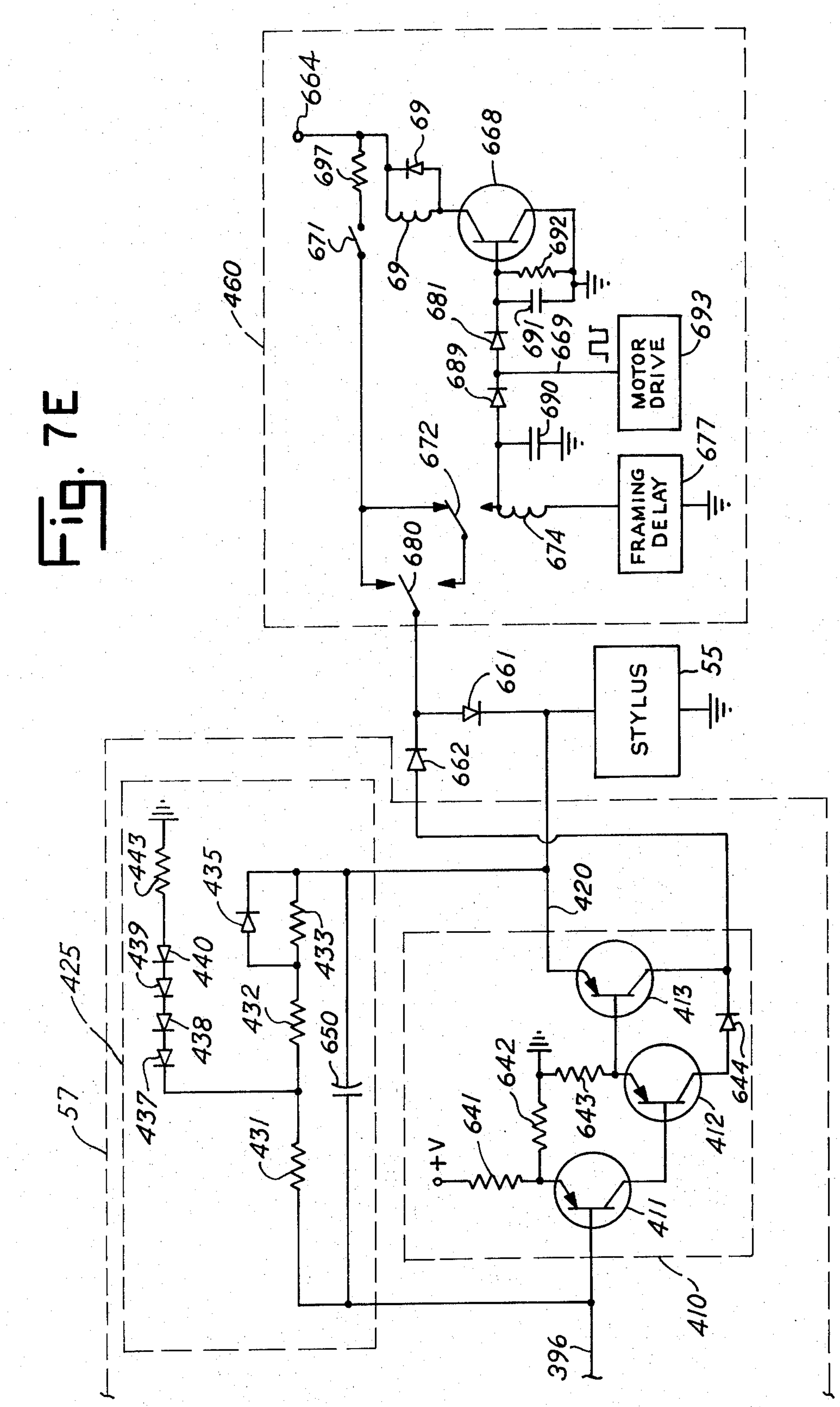

As shown in FIG. 7E, signals on output conductors 396 are applied to the input of an amplifier 410 which includes transistors 411, 412, and 413. Amplifier 410 is of standard configuration and exhibits negative gain; that is, positive-going signals applied to conductor 396 are translated into amplified, negative-going signals on output conductor 420.

A non-linear feedback network 425 is employed to reshape the waveform of the baseband signal prior to its application to the stylus. Such reshaping accomplishes the following objectives:

1. Further gray-scale correction through the preferential amplification of signals in the near black region of the gray-scale;
2. Reshifting the average value of the baseband signal downward, toward the zero (white) level, in order to compensate for the intentional shift toward the black level accomplished at the transmitter; and
3. Matching the waveform of the baseband signal to the amplitude-response characteristics of the stylus 55. These objectives are accomplished by the non-linear feedback network 425 which, in combination with the thresholding accomplished by transistors 397 and 398 and diode 399 in the circuit shown on 7D, provide an overall response of the stylus driving circuitry of the type illustrated by FIG. 2C of the drawings.

The non-linear feedback network 425 comprises the series combination of resistors 431, 432, 433 connected between the output of amplifier 410 and its input. The junction of resistors 431 and 432 is connected through four serial connected diodes 437, 438, 439, and 440, and resistor 433 to ground. For lower signal levels, diodes 437-440 are non-conductive and the gain of the amplifier 410 remains substantially constant. When the signal level reaches a sufficient value, however, the diodes 437-440 begin to conduct in a gradual fashion, decreasing the amount of negative feedback, and increasing the overall gain of the combination of amplifier 410 and feedback network 425, to produce the effect indicated by the region Y of the curve of FIG. 2C of the drawings.

Where a mechanically moving pressure stylus is employed to create the reproduced image, it is desirable to provide means for totally retracting the stylus by the application of a reverse voltage thereto. In the arrangement shown in FIG. 7E in the drawings, this is accomplished by a retraction logic circuit 460 which either supplies a positive, retracting voltage to the stylus 55 through a diode 661 or applies a negative operating potential to the amplifier 410 through a diode 662, allowing that amplifier to control the operation of the stylus.

It is desirable to retract the stylus whenever the stylus carrier is moving relative to the image-receiving paper carrier unless the transceiver is operating in its receive mode and is actually printing an image. Retracting the stylus at all times during sending, and also during the initial framing period, and final run-down period, when operating in the receive mode, yields quieter operation at these times, and eliminates unnecessary wearing of both the stylus and the surface of the paper-carrying mandrel.

The retraction logic circuit 460 accomplishes this objective as follows: When the transceiver is turned ON, power is supplied to the postive supply terminal 664. Transistor 668 does not conduct, however, until an A.C. voltage appears on output conductor 669 from the motor drive circuitry 693 of the transceiver. With transistor 668 non-conductive, relay contact 671 is open, and relay switch 672 is in its upper position (as shown on FIG. 7E) since solenoid coil 674, which operates relay switch 672, is energized only when a motor drive signal appears on conductor 669 and the circuit including conductor 676 is completed by the framing delay control circuit 677, which allows adequate time for the scanning mechanisms at both the transmitting and receiving stations to reach this full synchronized running speed. Switch 680 is manually controlled from the transceiver control panel, depending upon whether the transceiver is to operate in the receive or transmit mode.

When the transceiver motor is initially turned ON, a positive signal is applied via conductor 669 and diode 681 to the base of transistor 668, turning that transistor ON and closing switch 671. Relay switch 672 stays in its upper position however until a suitable delay period elapses (during which time the two transceivers are synchronized). At the end of this delay period, framing delay circuit 677 permits current to flow through solenoid 674, switching relay switch 672 to its lower position and (if switch 680 is in the receive position) applying a negative operating voltage to diode 662 over the path comprising switch 680, switch 672, and rectifier diode 689, which, with filter capacitor 690 converts the A.C. motor drive signal on conductor 669 into a negative supply voltage for operating both amplifier 410 and solenoid 674.

When the transmission of an image is completed, the motor drive signal on conductor 669 ceases, causing switch 672 to return to its upper position, applying a positive stylus retraction voltage to diode 661. Switch 672 does not again open, however, until capacitor 691 discharges through resistance 692, which insures that the stylus remains positively retracted until the scanning mechanism has come to a complete stop. Note that diode 662 becomes back-biased to effectively protect the transistor 413 during the stylus retraction period but routes power through the stylus drive amplifier during the receive part of the cycle so as to print copy.

In the preferred embodiment of the invention which has been described in detail in connection with the schematic diagrams, FIGS. 6A – 6C and 7A – 7E, the nature of the signal processing accomplished is dictated in part by the values of the discrete elements employed. As is well known to those skilled in the art, different element values can be employed to accomplish equivalent functions; however, the relationships existing between these element values is, in many cases, important. For this reason, representative element values which can be employed to instrument the arrangement shown in FIGS. 6 and 7 of the drawings are set forth below, resistance values being given in ohms:

FIGURE 6A

| | | |
|---|---|---|
| Resistor | 16 | 110k |
| | 60 | 13.3k |
| | 62 | 13.3k |
| | 77 | 33k |
| | 78 | 10–20k |
| | 84 | 11.8k |
| | 94 | 3,000 |

FIGURE 6A-Continued

| | | |
|---|---|---|
| | 95 | 62k |
| | 102 | 5100 |
| | 106 | 2000 |
| | 116 | 1000 |
| | 126 | 200 |
| Capacitor | 63 | 012mfd |
| | 76 | 4700pf. |
| | 82 | 4700pf. |
| | 120 | 33mfd. |

FIGURE 6B

| | | |
|---|---|---|
| Resistor | 140 | 10k |
| | 142 | 3300 |
| | 152 | 16–21k |
| | 163 | 100k |
| | 164 | 200k |
| | 166 | 20 |
| | 172 | 200 |
| | 174 | 200 |
| | 182 | 1 k |
| | 187 | 10–15k |
| | 188 | 27.4k |
| | 189 | 55–75k |
| | 193 | 100 |
| | 194 | 100 |
| | 196 | 10k |
| Capacitor | 150 | 0033mfd. |
| | 160 | 1000pf. |
| | 173 | 10mfd. |
| | 178 | 1000pf. |
| | 179 | 10mfd. |
| | 192 | 4700mfd. |
| | 200 | 10mfd. |

FIGURE 6C

| | | |
|---|---|---|
| Resistor | 201 | 1500 |
| | 205 | 51k |
| | 206 | 47k |
| | 207 | 470k |
| | 211 | 3k |
| | 212 | 30k |
| | 214 | 20k |
| | 215 | 20k |
| | 216 | 2k |
| | 217 | 100k |
| | 218 | 4.7k |
| | 219 | 820 |
| | 223 | 75 |
| | 225 | 22k |
| | 226 | 1000 |
| | 227 | 1000 |
| | 228 | 22k |
| | 229 | 75 |
| | 231 | 120 |
| | 232 | 120 |
| | 233 | 1000 |
| | 234 | 100k |
| Capacitor | 203 | 10mfd. |
| | 222 | 1 mfd. |
| Inductor | 221 | 750mh. |

FIGURE 7A

| | | |
|---|---|---|
| Resistor | 234 | 300 |
| | 235 | 100k |
| | 236 | 300 |
| | 237 | 100k |
| | 241 | 220k |
| | 243 | 220k |
| | 245 | 100k |
| | 246 | 330k |
| | 450 | 1800k |
| | 460 | 270k |
| | 461 | 100k |
| | 462 | 36k |
| | 463 | 10k |

FIGURE 7A-Continued

| | | |
|---|---|---|
| | 464 | 43k |
| | 465 | 910 |
| | 468 | 10k |
| | 469 | 100k |
| | 470 | 330k |
| | 471 | 10k |
| Capacitor | 238 | 470 pf. |
| | 239 | 470 pf. |
| | 242 | .1 mfd. |
| | 247 | 47 mfd. |
| | 248 | .01 mfd. |
| | 263 | .15 mfd. |
| | 265 | 1.0 mfd. |
| | 451 | .062 mfd. |
| | 452 | .0503 mfd. |
| | 454 | .062 mfd. |
| | 466 | .01 mfd. |
| | 467 | .01 mfd. |
| Inductor | 453 | |

FIGURE 7B

| | | |
|---|---|---|
| Resistor | 281 | 1 k |
| | 282 | 100 k |
| | 289 | 11 k |
| | 292 | 5300 |
| | 296 | 4700 |
| | 301 | 10 k |
| | 302 | 5110 |
| | 303 | 5110 |
| | 501 | 1500 |
| | 502 | 5 k |
| | 504 | 10 k |
| | 505 | 4700 |
| | 506 | 15 k |
| | 507 | 1 k |
| | 509 | 100 k |
| | 510 | 100 k |
| | 512 | 10 k |
| | 513 | 4700 |
| | 516 | 15 k |
| | 518 | 10 k |
| | 519 | 4700 |
| | 522 | 15 k |
| Capacitor | 280 | .22 mfd. |
| | 291 | .01 mfd. |
| | 297 | 10 mfd. |
| | 503 | .1 mfd. |
| | 508 | .033 |
| | 511 | .47 |
| | 517 | .1 |

FIGURE 7C

| | | |
|---|---|---|
| Resistor | 316 | 51 ohms. |
| | 341 | 10 k |
| | 342 | 33 k |
| | 347 | 0–100 k |
| | 349 | 0–10 k |
| | 532 | 5100 |
| | 533 | 10 k |
| | 534 | 1000 |
| | 536 | 51 k |
| | 537 | 51 k |
| | 538 | 200 k |
| | 541 | 33 k |
| | 551 | 3300 |
| | 560 | 6800 |
| | 561 | 2700 |
| | 562 | 4700 |
| | 570 | 2400 |
| | 571 | 200 k |
| | 572 | 68 k |
| | 573 | 510 k |
| | 574 | 120 k |
| | 575 | 390 k |
| | 590 | 680 |
| | 592 | 6.8 k |
| | 593 | 12 k |
| Capacitor | 312 | .047 mfd. |
| | 335 | .001 |
| | 531 | .0033 mdf. |

FIGURE 7C-Continued

| | | |
|---|---|---|
| | 535 | .001 |
| | 539 | 270 pf. |
| | 550 | .1 mfd. |

FIGURE 7D

| | | |
|---|---|---|
| Resistor | 363 | 12 k |
| | 365 | 0–50 k |
| | 366 | 6.8 k |
| | 367 | 24 k |
| | 368 | 12 k |
| | 369 | 0–10 k |
| | 370 | 680 |
| | 378 | 13.3 k |
| Resistor | 380 | 1.74 k |
| | 392 | 0–5 k |
| | 400 | 0–500 |
| | 402 | 10 k |
| | 403 | 100 k |
| | 600 | 1.5 k |
| | 607 | 620 |
| | 610 | 10 k |
| | 612 | 24 k |
| | 613 | 8.2 k |
| | 615 | 51 k |
| | 620 | 13 k |
| | 621 | 2700 |
| | 622 | 1000 |
| | 623 | 2200 |
| | 624 | 15 k |
| | 625 | 10 k |
| | 630 | 2000 |
| Capacitor | 393 | .047 |
| | 405 | .01 |
| | 601 | .062 |
| | 602 | .075 |
| | 603 | .062 |
| | 611 | .01 |
| | 614 | .027 |
| Inductor | 604 | 50 mk. |

FIGURE 7E

| | | |
|---|---|---|
| Resistor | 431 | 5100 |
| | 432 | 120 |
| | 433 | 5000 |
| | 443 | 27 |
| | 641 | 3000 |
| | 642 | 100 |
| | 643 | 470 |
| Capacitor | 650 | 100 pf. |

While a particular embodiment of the invention has been described in detail, and particular element values supplied, it will be appreciated that numerous modifications can be made to the system described, thus obtaining the desired results in equivalent ways, without departing from the true spirit and scope of the invention.

What is claimed is:

1. In combination, means for converting image information into a time-varying electrical baseband signal, a non-linear transfer network for reshaping the waveform of said baseband signal to produce a modulating signal having limits between a first signal level representing black and a second signal level representing white, said network including means for increasingly shifting the short-term average level of said modulating signal toward said first level and away from said second level with increasing baseband signal frequency;

means for translating said modulating signal into a message signal having an instantaneous frequency which varies between an upper frequency when said modulating signal is at said first level, to a lower frequency when said modulating signal is at said second level;

means for transmitting said message signal over a communication channel to a receiving station; and means at said receiving station responsive to said message signal for reproducing said image information.

2. An arrangement as set forth in claim 1 in which said means for converting image information into a time-varying baseband signal comprises, in combination, photoelectric means at said sending station for scanning an image composed of light and dark areas to produce a time-varying scan signal in which light areas are represented by signal levels of greater magnitude and dark areas by signal levels of lesser magnitude, and means for forming the sum of said scan signal and a constant-level signal of opposite polarity to form said baseband signal in which dark areas are represented by signal levels of greater magnitude and light areas are represented by signal levels of lesser magnitude.

3. An arrangement as set forth in claim 1 wherein said means for increasingly shifting the short term average level of said modulating signal with increasing frequency comprises, in combination, a capacitor serially connected with a non-linear impedance element, the impedance presented by said capacitor decreasing with increasing modulating signal frequency and the impedance of said non-linear element decreasing and increasing modulating signal amplitude.

4. An arrangement as set forth in claim 3 including at least one diode for providing a low-impedance path through which said capacitor can discharge.

5. In combination, a source of a time-varying baseband signal;

a controlled signal generator responsive to said baseband signal for producing a message signal having a frequency related to the amplitude of said baseband signal, said message signal comprising carrier and sideband frequency components;

a channel having a predetermined passband for transmitting said message signal from a sending to a receiving station; and means for shifting the effective carrier frequency of said message signal with respect to the passband of said channel to increase the proportion of said passband available for one sideband of said message signals whenever substantial high-frequency components appear in said baseband signal, said means for shifting the carrier frequency comprising a non-linear network interposed between said source of baseband signals and said controlled signal generator for altering the waveshape of the signal from said source to shift the average value of said baseband signal.

6. An arrangement as set forth in claim 5 in which said source of a time-varying baseband signal comprises, in combination, photoelectric means at said sending station for scanning an image composed of light and dark areas to produce a time-varying scan signal in which light areas are represented by signals levels of greater magnitude and dark areas by signal levels of lesser magnitude, and means for forming the sum of said scan signal and a constant-level signal of opposite polarity to form said baseband signal in which dark areas are represented by signal levels of greater magnitude and light areas are represented by signal levels of lesser magnitude.

7. An arrangement for transmitting an image from a sending to a receiving station comprising, in combination, means for scanning said image to produce a time-varying electrical baseband signal characterized in that black image areas are represented by a first signal level, white by a second signal level, and the intermediate black-to-white gray-scale by the scale of signal levels bounded by said first and second levels;

first signal reshaping means at said sending station for preferentially amplifying low-frequency baseband signal variations near said first signal level in comparison to like variations near said second signal level;

second signal reshaping means at said sending station for shifting the short-term average value of said baseband signal toward said first level whenever said baseband signal contains substantial high-frequency components;

means for converting said baseband signal, as modified by said first and second reshaping means, into a cyclical message signal having an instantaneous frequency related to the magnitude of said modified baseband signal;

a band-limited communication channel for transmitting said message signal from said sending station to said receiving station; and means at said receiving station for converting said message signal into a replica of said image.

8. In a facsimile system, a circuit for reshaping the waveform of a time-varying signal representing white by a first signal amplitude level, black by a second signal amplitude level, and the white-to-black gray-scale by amplitudes within the range bounded by said first and second levels, said circuit comprising, in combination, an amplifier having an input and an output, a negative feedback network connected between said input and said output, said network including a first non-linear impedance element for reducing the amount of negative feedback as the amplitude of said signal approaches said second amplitude level and a second non-linear impedance element serially connected with a capacitor for reducing the amount of negative feedback for higher frequency signal variations greater than a predetermined intensity, and clamping means for limiting said signal to amplitudes within a range bounded by said first and second levels.

9. A circuit as set forth in claim 8 including at least one diode connected to provide a low-impedance discharge path for said capacitor.

10. In a facsimile transceiver capable of operation in both sending and receiving modes, a stylus driving network comprising, in combination, a demodulator for producing a stylus-driving signal in which white is represented by substantially zero signal amplitude and black is represented by a signal of substantial magnitude having a first polarity, and
a logic circuit for applying a signal of opposite polarity to said stylus to retract said stylus whenever said transceiver is operating in said sending mode and to further retract said stylus when said transceiver is operating in said receiving mode for predetermined periods preceding and following the appearance of said stylus driving signal.

* * * * *